(12) United States Patent
Susaki et al.

(10) Patent No.: US 6,253,322 B1
(45) Date of Patent: Jun. 26, 2001

(54) ELECTRONIC CERTIFICATION AUTHENTICATION METHOD AND SYSTEM

(75) Inventors: Seiichi Susaki, Yokohama; Yasuhiko Mizuno, Sakura; Miwa Takahashi; Satoshi Mitsunaga, both of Kawasaki; Shoji Moriyama, Tokyo, all of (JP)

(73) Assignee: Hitachi, Ltd., Tokyo (JP)

( * ) Notice: Subject to any disclaimer, the term of this patent is extended or adjusted under 35 U.S.C. 154(b) by 0 days.

(21) Appl. No.: 09/081,555

(22) Filed: May 20, 1998

(30) Foreign Application Priority Data

May 21, 1997 (JP) .................................................. 9-147319

(51) Int. Cl.[7] ...................................................... H04L 9/00
(52) U.S. Cl. ......................... 713/170; 713/173; 705/59; 705/67
(58) Field of Search .................................... 713/150, 173, 713/170, 168, 176; 705/4, 59, 67, 65

(56) References Cited

U.S. PATENT DOCUMENTS

| | | | |
|---|---|---|---|
| 4,264,808 | * 4/1981 | Owens et al. | 705/30 |
| 5,410,646 | * 4/1995 | Tondevold et al. | 707/507 |
| 5,422,953 | * 6/1995 | Fischer | 713/172 |
| 5,655,085 | * 8/1997 | Ryan et al. | 705/4 |
| 5,659,616 | * 8/1997 | Sudia | 705/76 |
| 5,724,425 | * 3/1998 | Chang et al. | 705/52 |
| 5,765,176 | * 6/1998 | Bloomberg | 707/514 |
| 5,812,942 | * 9/1998 | Allen et al. | 455/139 |
| 5,828,751 | * 10/1998 | Walker et al. | 713/175 |
| 5,832,460 | * 11/1998 | Bednar et al. | 705/27 |
| 5,850,442 | * 12/1998 | Muftic | 705/65 |
| 5,903,882 | * 5/1999 | Asay et al. | 705/44 |
| 6,038,551 | * 3/2000 | Barlow et al. | 705/41 |

* cited by examiner

*Primary Examiner*—Tod Swann
*Assistant Examiner*—Stephen Kabakoff
(74) *Attorney, Agent, or Firm*—Antonelli, Terry, Stout & Kraus, LLP

(57) ABSTRACT

Certification and authentication services (electronic information signing and archiving services) are given when electronic commerce is carried out in an open network such as Internet. A system has a service supplying unit and service receiving units which are connected to one another through a communication network. In the system, the service supplying unit transmits contract information including a content of a contract to the service receiving units of the service receivers. Each of the service receiving units having received the contract information prepares one party-signed contract information in which the contract information is digitally signed by the service receiver and transmits the one party-signed contract information to the service supplying unit. The service supplying unit receives the one party-signed contract information transmitted from each of the service receiving units, synthesizes a plurality of received copies of one party-signed contract information into a single document, prepares contract information signed by the service supplier in which the document is digitally signed by the service supplier, and archives the prepared service supplier-signed contract information and transmits such contract information to each of the service receiving units.

40 Claims, 22 Drawing Sheets

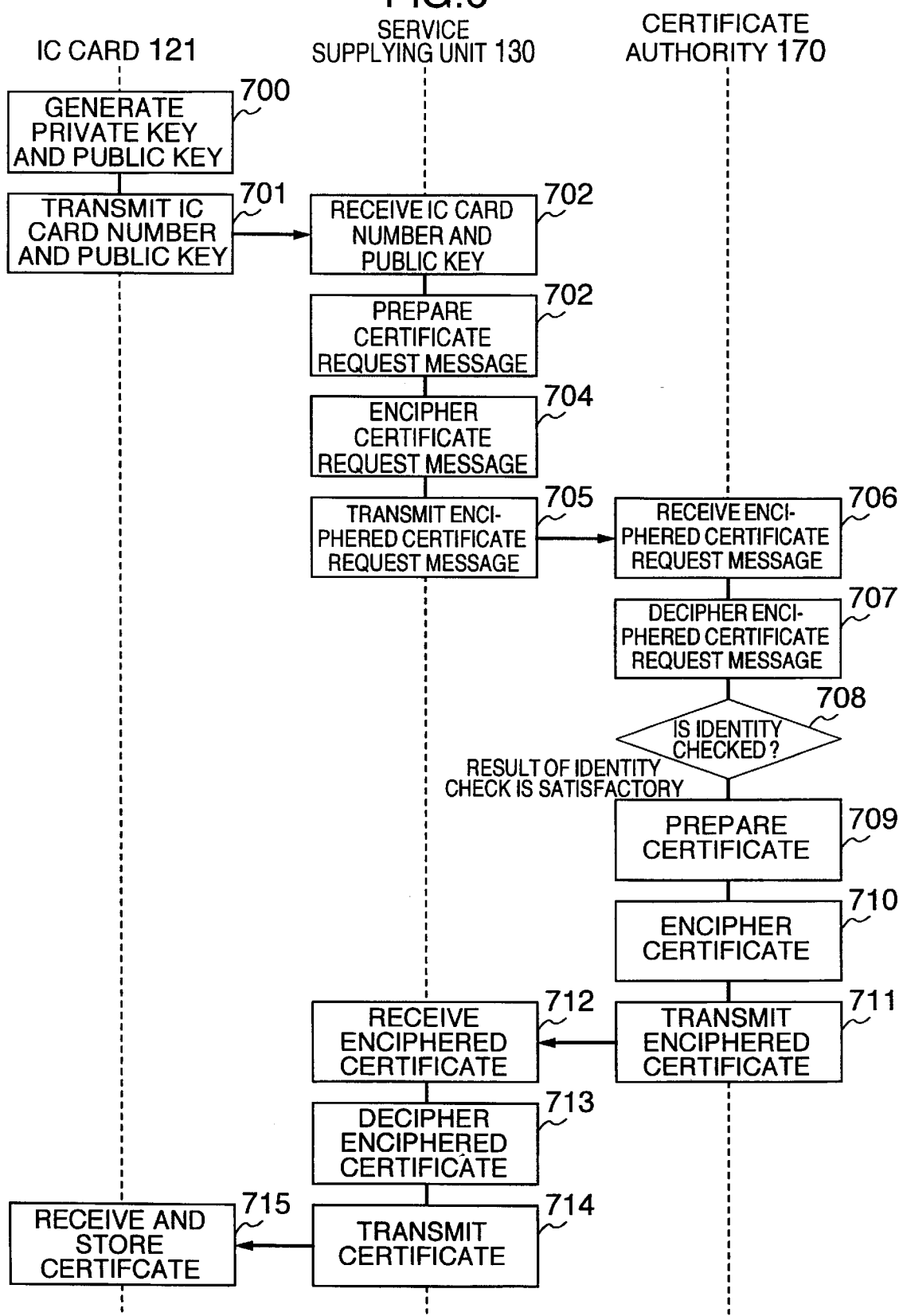

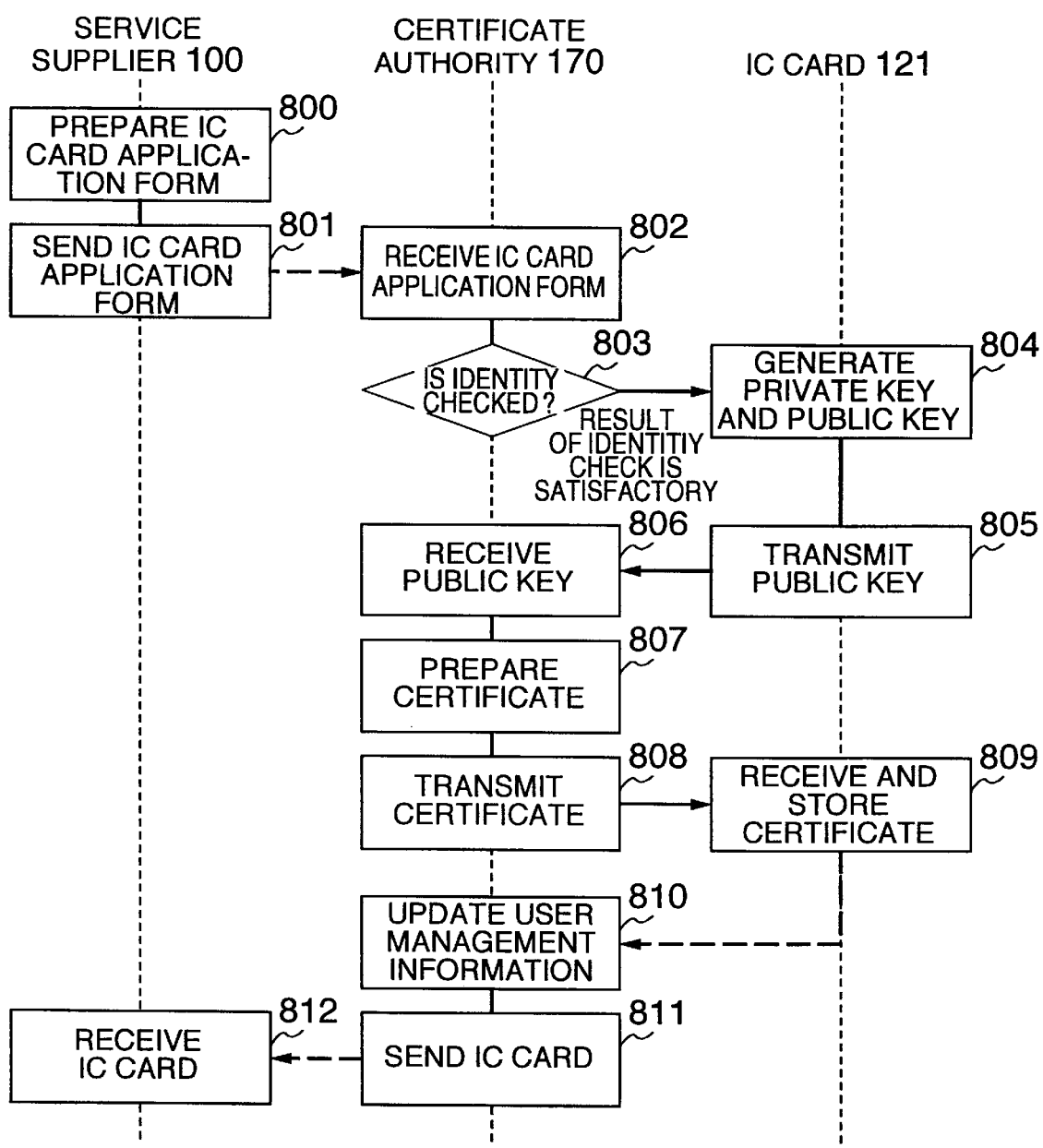

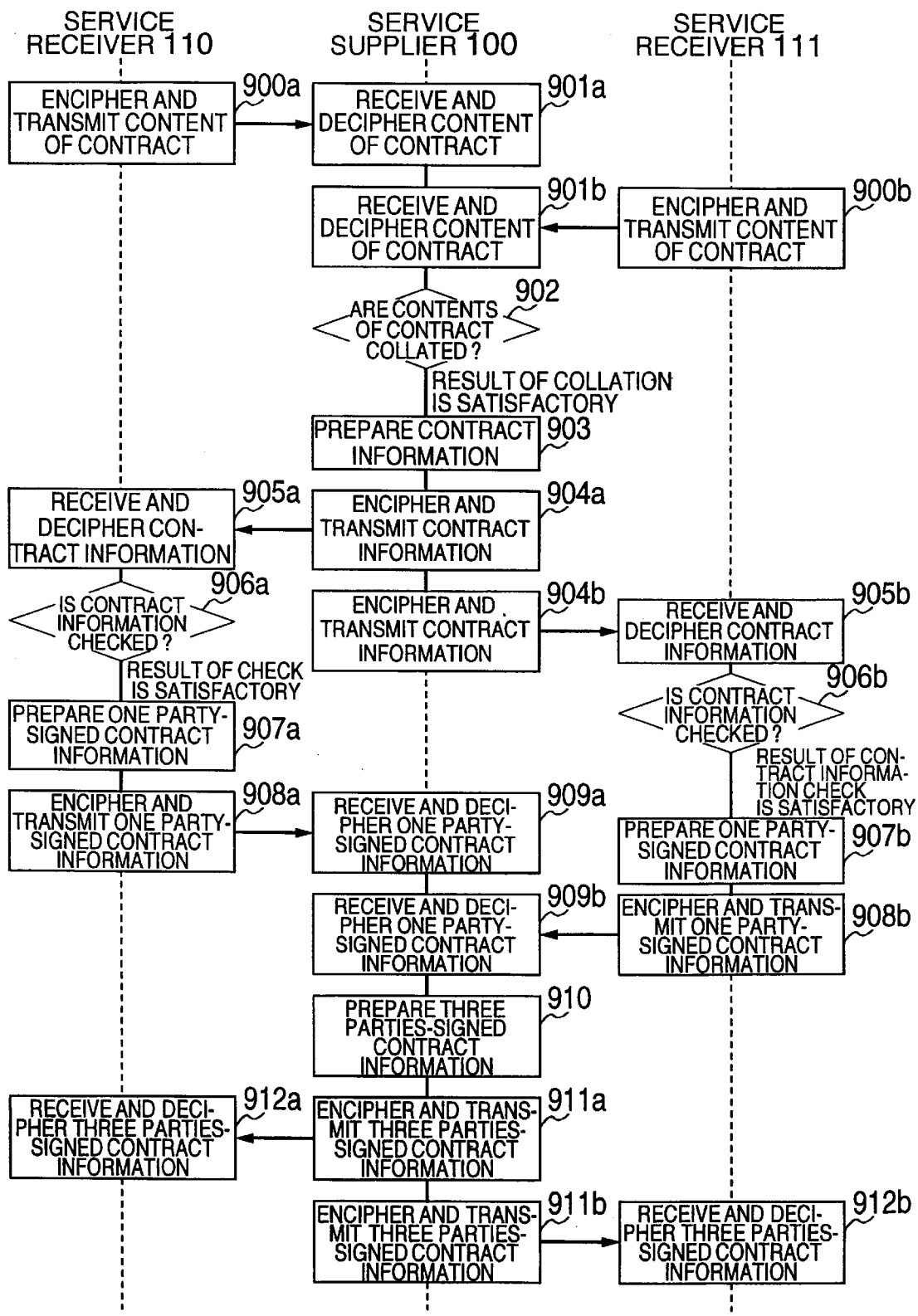

FIG.9A

ONE PARTY-SIGNED CONTRACT INFORMATION 161

| CONTRACT INFORMATION | APPENDED INFORMATION a | SIGNATURE a |
|---|---|---|
| 160 | 1000a | 1001a |

FIG.9B

ONE PARTY-SIGNED CONTRACT INFORMATION 162

| CONTRACT INFORMATION | APPENDED INFORMATION b | SIGNATURE b |
|---|---|---|
| 160 | 1000b | 1001b |

FIG.9C

THREE PARTY-SIGNED CONTRACT INFORMATION 163

| CONTRACT INFORMATION | APPENDED INFORMATION a | APPENDED INFORMATION b | APPENDED INFORMATION c | SIGNATURE a | SIGNATURE b | SIGNATURE c |
|---|---|---|---|---|---|---|
| 160 | 1000a | 1000b | 1000c | 1001a | 1001b | 1001c |

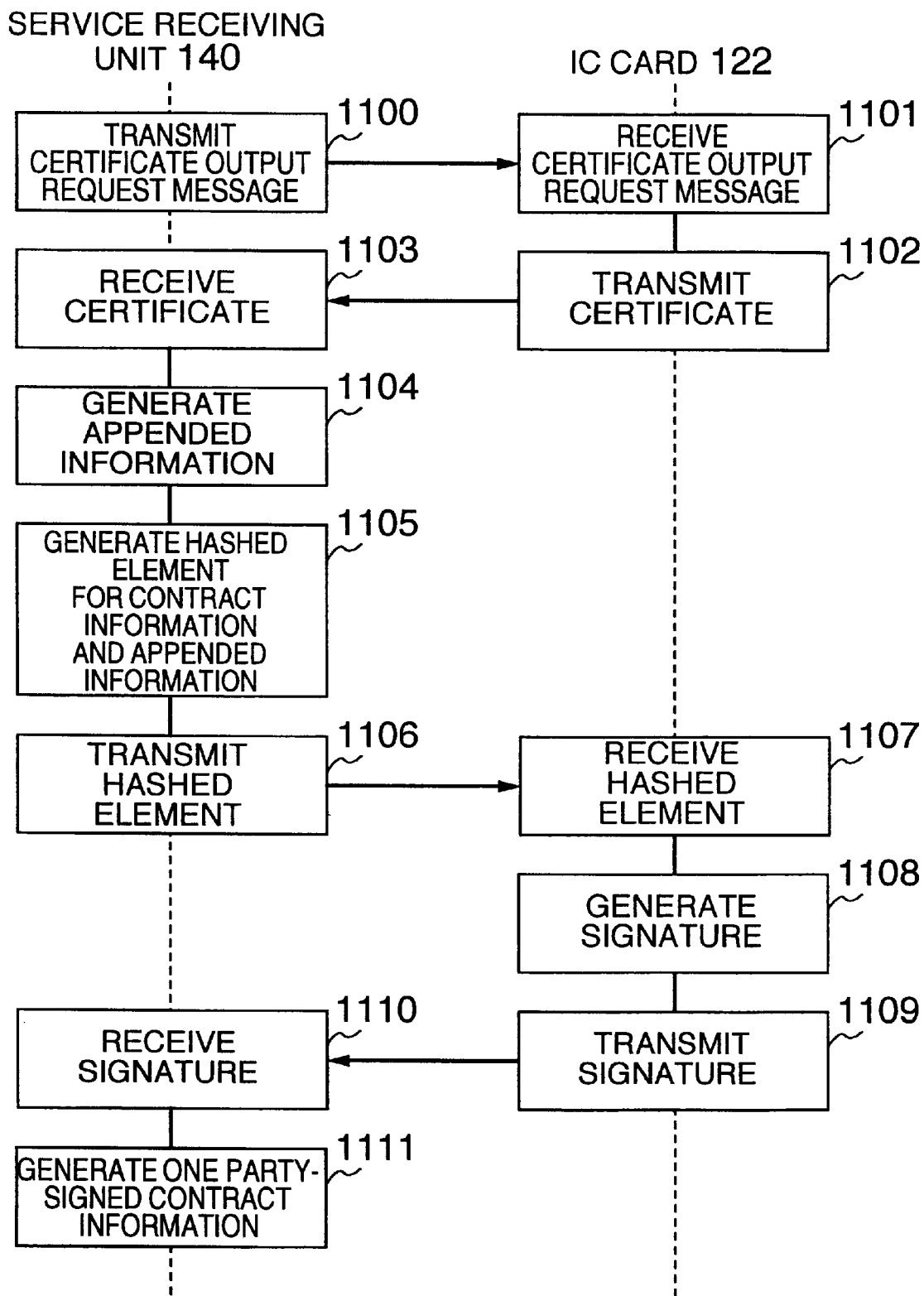

FIG.18

| MEMBERSHIP CARD NUMBER | NAME OF MEMBER | INDIVIDUAL CERTIFYING DOCUMENT NUMBER | VALID PERIOD || PUBLIC KEY OF MEMBER || RESERVED AREA |
| --- | --- | --- | --- | --- | --- | --- | --- |
| | | | STARTING DATE AND TIME | ENDING DATE AND TIME | ALGORITHM OF KEY | KEY (IN BIT STRING) | |
| | | | | | | | |

3315

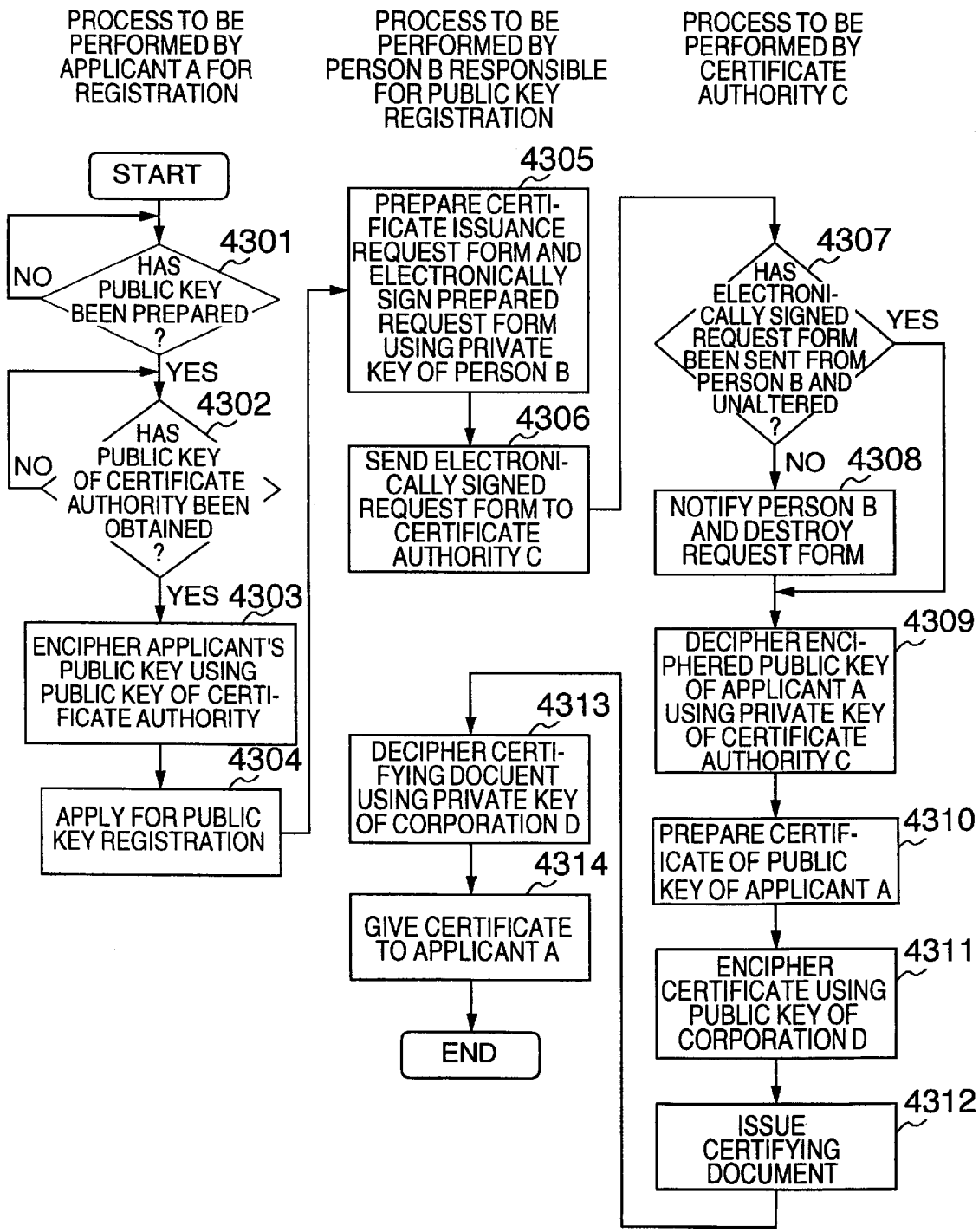

ELECTRONIC CERTIFICATION AUTHENTICATION METHOD AND SYSTEM

BACKGROUND OF THE INVENTION

The present invention relates to electronic certification and authentication methods and systems.

Reliable electronic commerce using cryptographic technology has been implemented in recent years in an open network environment such as Internet.

The enciphering of information involves a cryptographic algorithm and a cryptographic key. The cryptographic algorithm means a process (enciphering) for converting intelligible information that is expressed in plaintext into unintelligible information that is expressed in ciphertext and a process (deciphering) for converting ciphertext into plaintext. The cryptographic key means a control parameter used in the converting processes executed by the cryptographic algorithm. Even if a plaintext message is enciphered using the same cryptographic algorithm, resultant ciphertext messages may be different from one another depending on the cryptographic keys used. Therefore, in order to decipher ciphertext into corresponding plaintext, the same cryptographic key as that used for the enciphering or a cryptographic key that is paired with the cryptographic key used at the time of the enciphering must be used. The cryptographic algorithm requiring that exactly the same cryptographic key used for enciphering be used for deciphering is called "symmetric-key cryptography", or "common-key cryptography" like in the former case, whereas the cryptographic algorithm using different cryptographic keys for enciphering and deciphering is called "asymmetric-key cryptography", or "public-key cryptography." Common-key cryptography implements high-speed processing but entails time and labor in managing keys, whereas public-key cryptography does not implement high-speed processing but is easy in managing keys and, in addition, is advantageous in that it is applicable to digital signature generation.

That is, public-key cryptography, due to asymmetry of two keys used for enciphering and deciphering, allows one of the keys (public key) to be disclosed to the public. As a result, public-key cryptography provides relatively easier cryptographic key management than common-key cryptography, and is also advantageous in that it is applicable to digital signature generation. However, in utilizing public-key cryptography, correspondence between a publicly disclosed public key and the possessor of such public key must be ensured. The reason therefor is as follows. If an illegal user A prepares a public key of a user B under the disguise of the user B and discloses the thus prepared public key as the public key of the user B (the private key corresponding to such public key is possessed by the illegal user A), then a user C might erroneously certify the illegal user A as being the user B by checking the digital signature of the user B forged by the illegal user A through deciphering using the public key of the user B. Moreover, as a result of such erroneous certification, all the information addressed to the user B is leaked to the illegal user A. Therefore, in constructing an environment in which public-key cryptography can be utilized, it is essential to provide a means for ensuring correspondence between a public key and its possessor.

A certification authority is a means for solving such problem in a large-scale open network such as Internet. A framework for certification using a certification authority and a certificate has been specified by CCITT (The International Telegraph and Telephone Consultative Committee) in its resolution X.509. The certificate means a public key of the possessor of the certificate and data that is made unforgeable by enciphering the certificate and other pieces of information using a private key of the certification authority that has issued the certificate, i.e., by putting a digital signature of the certification authority. All the entities using the system can check and certify the authenticity of a public key included in a certificate of other entity only by holding the certificate (public key) of the certification authority safely and checking the digital signature of the certification authority put on the certificate of the other entity.

By the way, electronic commerce in a network environment such as Internet tends to expand from electronic commerce between consumers and malls to electronic commerce between enterprises. Electronic commerce between enterprises will be more and more oriented towards not only attaining transaction security but also providing "authentication service" in which the contents of a transaction and the fact that the transaction was made are certified and in which the evidence of such facts is archived for a predetermined period of time. Further, such authentication service may possibly be expanded to areas other than electronic commerce (i.e., services currently supplied by a notary public at a notary's office, such as administering wills). It may be noted that an invention related to electronic commerce is disclosed in, e.g., U.S. Pat. No. 5,671,279.

However, ISO is standardizing the "non-repudiation" technology, but such standardization is still on a framework level and, therefore, implementation formalities are not yet specified. Further, a service for safekeeping electronic information that is received online (electronic safe deposit box) is available. However, not administered on a transaction basis, such service is not suited to utilize "authentication service". Still further, although the Civil Affairs Bureau of the Ministry of Justice advocates the necessity of an electronic certification and authentication system in electronic commerce, what is envisaged by the Bureau is merely an outline, lacking implementation formalities. It may be noted that the non-repudiation technology is disclosed in, e.g., U.S. Pat. No. 5,615,268.

SUMMARY OF THE INVENTION

The object of the present invention is to implement certification and authentication services (electronic information signing and archiving services) necessary in dealing with electronic commerce in an opening network environment.

To achieve the above object, the present invention is applied to an electronic certification and authentication method to be applied to a system in which a service supplying unit and a plurality of service receiving units are connected to one another through a communication network, the service supplying unit being used by a service supplier who supplies an authentication service, each of the service receiving units being used by a service receiver who receives the authentication service. The method comprises the steps of: transmitting contract information from the service supplying unit to the service receiving units of the service receivers who are contracting parties, respectively, the contract information including a content of a contract; causing each of the service receiving units having received the contract information to prepare one party-signed contract information by causing the corresponding service receiver to electronically sign the contract information, and to transmit the one party-signed contract information to the service supplying unit; causing the service supplying unit to receive the one party-signed contract information transmitted from each of the service receiving units, to synthesize a plurality of received copies of one party-signed contract information into a single document, and then to prepare contract information signed by the service supplier by causing the service supplier to electrically sign the document; causing the service supplying unit to archive the prepared service supplier-signed contract information; and transmitting the service supplier-signed contract information from the service supplying unit to each of the service receiving units.

BRIEF DESCRIPTION OF THE DRAWINGS

FIG. 6 is a flowchart showing a procedure by which a service supplier requests a certificate authority to issue a certificate using his IC card and a service supplying unit in the embodiment shown in FIG. 1;

FIG. 7 is a flowchart showing a procedure by which a service supplier requests a certificate authority to issue an IC card storing a certificate therein, which is a modification of the embodiment shown in FIG. 1;

FIG. 8 is a flowchart showing an entire procedure of service between a service supplier and service receivers in the embodiment shown in FIG. 1;

FIGS. 9A to 9C are diagrams showing exemplary contract information signed by a single party in the embodiment shown in FIG. 1, exemplary contract information signed by a single party who is another service receiver, and exemplary contract information signed by three parties, respectively;

FIG. 10 is a flowchart showing the details of a procedure for generating contract information signed by a single party with the service receiving unit and the IC card cooperating with each other in the embodiment shown in FIG. 1;

FIG. 18 is a diagram showing an internal structure of a membership card database used in the embodiment shown in FIG. 17;

FIG. 24 is a flowchart showing a public key registration procedure in another embodiment of the present invention.

DESCRIPTION OF THE PREFERRED EMBODIMENTS

Embodiments of the present invention will now be described with reference to the drawings.

Figure 1:
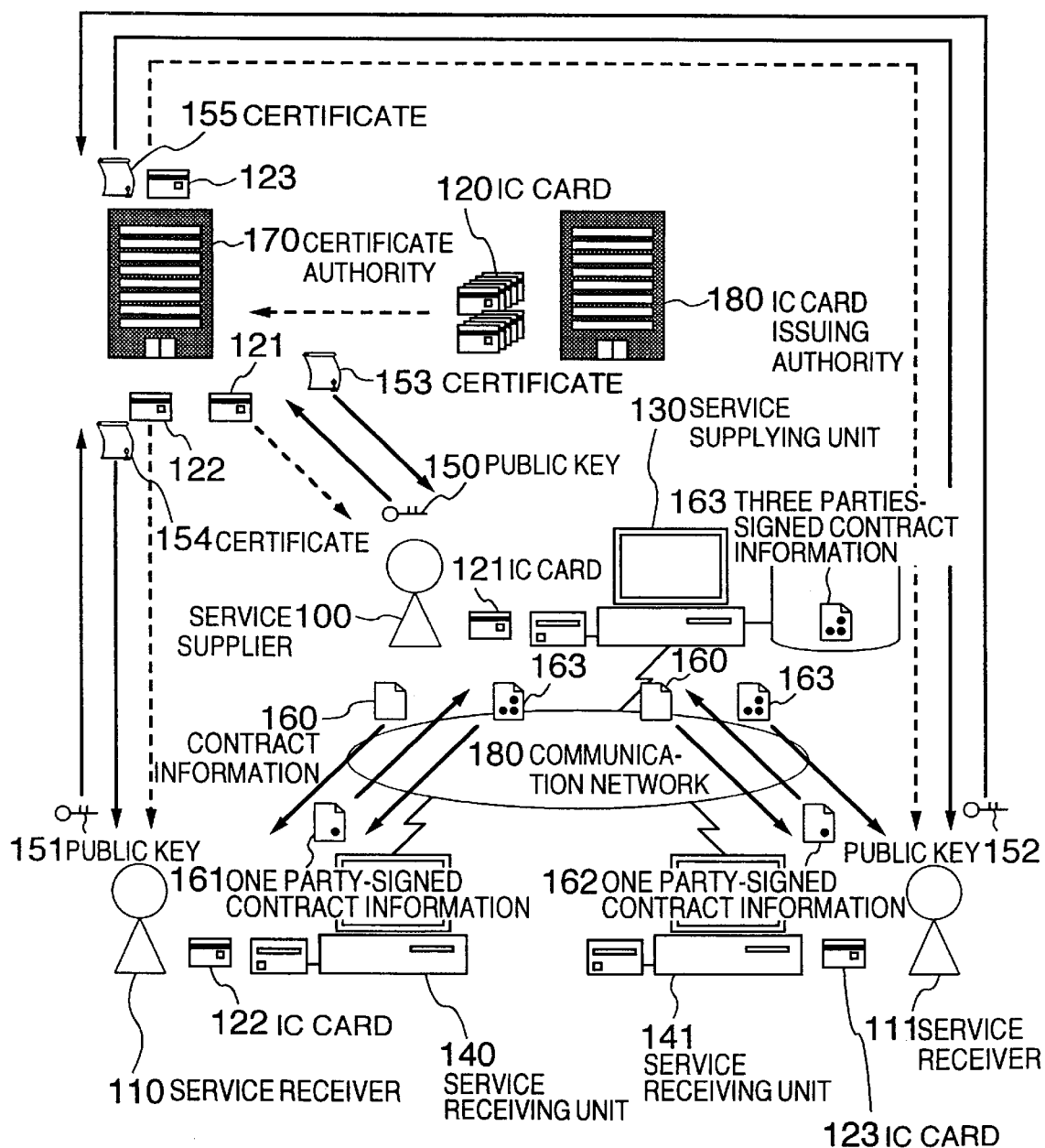
FIG. 1 is a diagram showing a configuration of an electronic authentication system, which is an embodiment of the present invention.

FIG. 1 is a diagram showing a configuration of an electronic authentication system, which is a first embodiment of the present invention. In FIG. 1, reference numeral 100 denotes a service supplier who provides an authentication service; 130, a service supplying unit 130 used by the service supplier; 110 and 111, service receivers who receive the authentication service; and 140 and 141, service receiving units used by the service receivers 110 and 111, respectively. Although shown in personified form, the service supplier 100 and the service receivers 110 and 111 may not be limited to natural persons, but may be organizations such as judicial persons. Reference numeral 170 denotes a certificate authority that issues a certificate certifying that each of these persons is himself; and 180, an IC card issuing authority that issues an IC card 120 used in this system.

The service supplying unit 130 and the service receiving units 140 and 141 are connected to a communication network 180, so that these units can transfer various information among themselves. Although not shown in the drawing, a terminal unit for issuing certificates arranged within the certificate authority 170 is connected to the information network 180, so that this terminal unit can transfer various information with the service supplying unit 130 and the service receiving units 140 and 141.

A process flow of the authentication service according to this system will be described with reference to FIG. 1. It is supposed that the service receivers 110 and 111 have already agreed to conclude a contract. Both the service receivers 110 and 111 and the service supplier 100 request the certificate authority 170 to issue their IC cards 120 as advance preparations. The certificate authority 170 receives their requests, checks that those who made the requests are truly themselves through various techniques, and issues the IC cards 120. It is supposed here that the certificate authority 170 issues an IC card 121 to the service supplier 100, an IC card 122 to the service receiver 110, and an IC card 123 to the service receiver 111. It may be noted that dotted arrows in FIG. 1 indicate offline data transfer among these persons 100, 110 and 111 and that solid arrows indicate online data transfer among them through the communication network 180.

The certificate authority 170 is allowed to prepare IC cards 120 in whatever way, but is supposed to use IC cards 120 prepared by the IC card issuing authority 180, since this system is designed to use standardized IC cards (which will be described later with reference to FIG. 2).

The service supplier 100 and the service receivers 110 and 111 generate their public keys and private keys within their IC cards 121 to 123, respectively. Each IC card has the function of generating a public key and a private key. Then, the persons 100, 110 and 111 send the generated public keys 150, 151 and 152 to the certificate authority 170 to obtain certificates 153, 154 and 155. The process of sending the public keys 150 to 152 and obtaining the certificates 153 to 155 is performed online. The received certificates 153 to 155 are stored in the IC cards 121 to 123 of the persons 100, 110 and 111, respectively.

The following procedure may also be taken. The service receivers 110 and 111 receive their IC cards from the IC card issuing authority 180 directly or indirectly (e.g., through malls). The service receivers 110 and 111 generate their public keys using their IC cards and send the generated public keys to the certificate authority 170. The certificate authority 170 first checks that the persons 110 and 111 who have requested the organ to issue their certificates are themselves and then generates the certificates and returns the generated certificates to the service receivers 110 and 111.

The advance preparations for providing the authentication service are now complete.

The authentication service is given in the following procedure. First, the service receivers 110 and 111 who have already agreed to conclude a contract having a predetermined content send the content of the contract to the service supplier 100 online (or offline). The service supplier 100 prepares contract information 160 that is in a predetermined form into which the content of the contract has been synthesized, and sends the contract information 160 to the service receivers 110 and 111 online (or offline), respectively. The service receivers 110 and 111 check the contents of the contract information 160. If nothing is objectionable, the service receivers 110 and 111 insert their IC cards 122 and 123 to the service receiving units 140 and 141 and put digital signatures to the contract information 160 using their own private keys, respectively. That is, each IC card has the function of generating a signature. Up to this step, the service receiver 110 has prepared contract information 161 signed by a single party, or one party-signed contract information, and the service receiver 111 has also prepared one party-signed contract information 162.

The one party-signed contract information 161 and 162 are returned from the service receiving units 140 and 141 to the service supplying unit 130, respectively. The service supplier 100 prepares a single document into which both the one party-signed contract information 161 signed by the service receiver 110 and the one party-signed contract information 162 signed by the service receiver 111 are synthesized (the document may be constituted by a plurality of files). Then, the service supplier 100 prepares contract information 163 signed by three parties, or three parties-signed contract information, by putting a digital signature to the prepared document using his own IC card 121 and private key. The service supplier 100 then sends the three parties-signed contract information 163 to the service receivers 110 and 111, and archives the contract information 163 for a predetermined period of time.

With the above operation, the service supplier 100 has completed the authentication service (the authentication of the contract between the service receivers 110 and 111). Since the service supplier 100 archives the three parties-signed contract information for the predetermined period of time, the service supplier 100 can certify the content of the contract and the fact that the contract was concluded as long as the three-parties-signed contract information 163 is existing.

While the case where there are two service receivers has been described with reference to FIG. 1, the same applies to the case where there are three or more service receivers. For example, in the case where there are three service receivers, the service supplier prepares a document into which three copies of one party-signed contract information respectively sent from the three service receivers are synthesized, and puts his signature to the document to prepare contract information signed by four parties, or four party-signed contract information (contract information with signed by the service supplier) and archives the thus prepared contract information. Further, in the case where there is only one person, an "authentication service for a private document" can also be implemented.

Further, in the system according to this embodiment, online data transfer (at the time of issuance of certificates) among the service supplying unit 130, the service receiving units 140 and 141 and the terminal units of the certificate authority 170 is supposed to be effected through cryptographic communication. However, enciphering and deciphering for cryptographic communication using public keys and private keys are time-consuming. To overcome this shortcoming, cryptographic communication using a common key is often carried out. That is, a common key is shared using a public key of the certificate authority 170 (a certificate 513 of the certificate authority, which will be described later) and a public key enciphering algorithm (the sharing of the common key may also be termed "key exchange"), and cryptographic communication is carried out using the shared common key and a common key enciphering algorithm. Online data transfer between the service supplying unit 130 and the service receiving units 140 and 141 (for authentication service) is also supposed to be effected through cryptographic communication. That is, first, the service supplier and receivers exchange their certificates. Then, a common key is shared among the service supplier and receivers using the public key of the service supplier 100 and the public-key algorithm, and cryptographic communication is carried out using the shared common key and the common-key algorithm. In the cryptographic communication, the shared common key is used until a series of services are complete.

Figure 2:
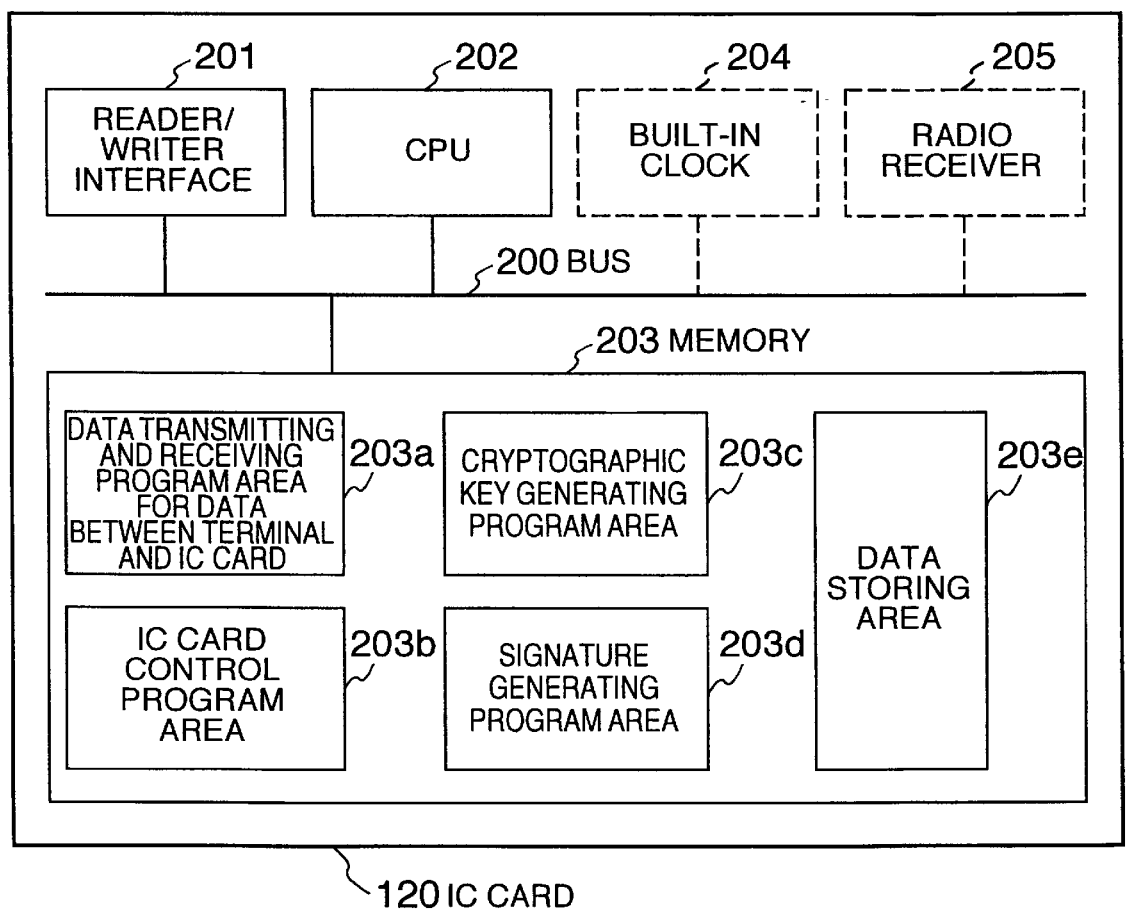
FIG. 2 is a diagram showing an internal structure of an IC card used in the embodiment shown in FIG. 1.

FIG. 2 is a diagram showing an internal structure of the IC card 120 issued by the IC card issuing authority 180 shown in FIG. 1. The IC cards 121 to 123 given by the certificate authority 170 to the service supplier 100 and the service receivers 110 and 111 are of this structure. As shown in FIG. 2, the IC card 120 comprises a reader/writer interface 201, a CPU (Central Processing Unit) 202 and a memory 203. These components are connected to one another through a bus 200.

The CPU 202 has an arithmetic function and controls the entire process within the IC card 120. The reader/writer interface 201 is used for data transfer between readers/writers 320 and 420 of the service supplier and receiver. The memory 203 has an area 203a that stores a data transmitting and receiving program for data between a terminal and an IC card, an area 203b that stores an IC card control program, an area 203c that stores a cryptographic key generating program, an area 203d that stores a signature generating program, and a data storing area 203e. The memory 203 is a nonvolatile memory that can keep data stored even after the IC card 120 is released from the reader/writer. When viewed from the CPU 202, the areas 203a to 203d are readable only and the data storing area 203e is readable and writable.

The data transmitting and receiving program for data between a terminal and an IC card stored in the memory 203 is used when data is transferred between the terminal and the IC card through the reader/writer. The IC card control program controls the whole operation of the IC card (including data flow control and access control). The cryptographic key generating program generates private keys and public keys. The signature generating program effects a process for digitally signing externally given data and returning the digitally signed data. The data stored in the data storing area 203e will later be described in detail with reference to FIG. 5.

It may be noted that reference numerals 204 and 205 respectively denote a built-in clock and a radio receiver that are included in an IC card 120 in another embodiment, which will be described later.

Figure 3:
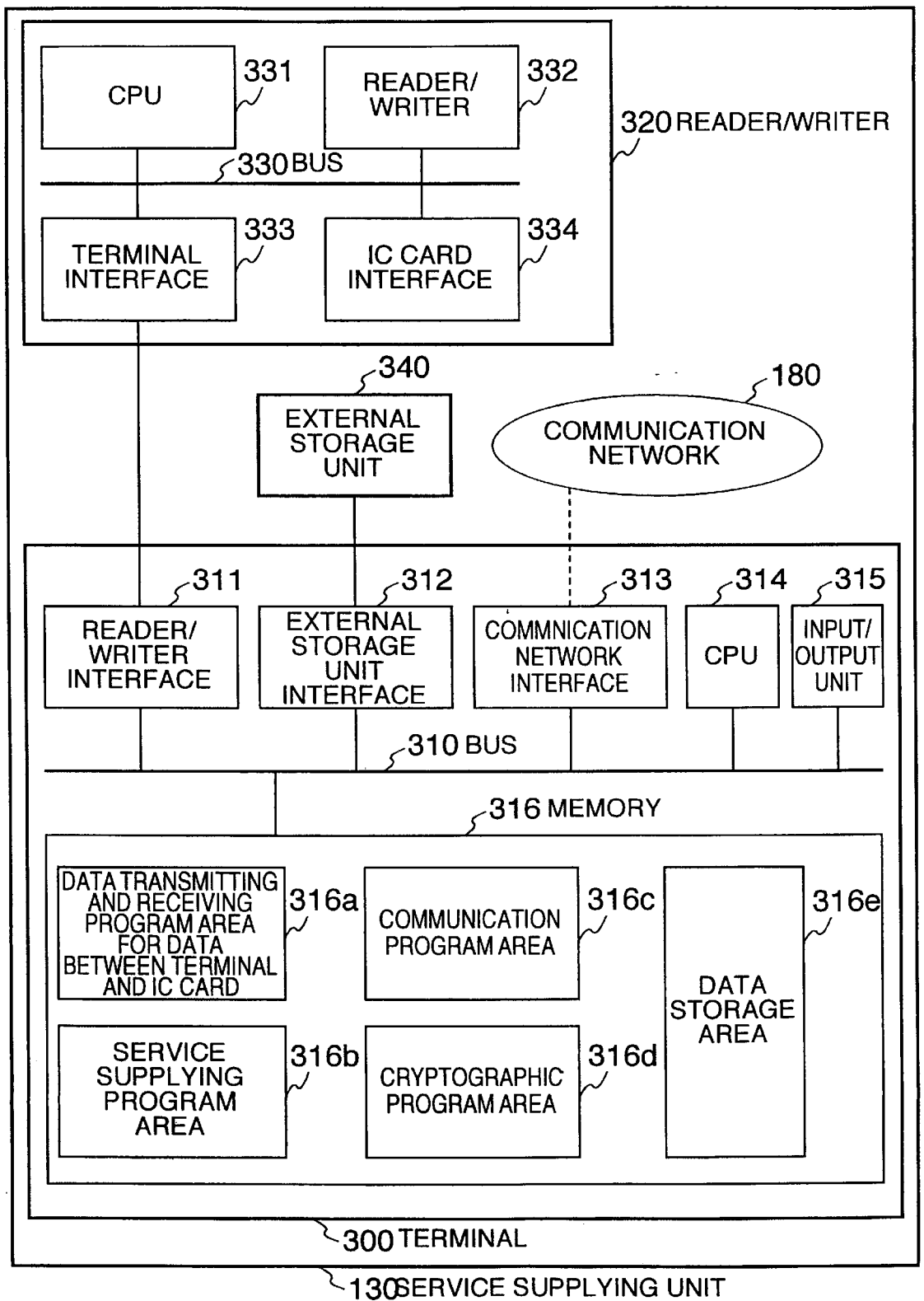
FIG. 3 is a diagram showing an internal structure of a service supplying unit used in the embodiment shown in FIG. 1.

FIG. 3 is a diagram showing an internal structure of the service supplying unit 130. As shown in FIG. 3, the service supplying unit 130 comprises a terminal 300, a reader/writer 320 and an external storage unit 340.

The terminal 300 comprises a reader/writer interface 311, an external storage unit interface 312, a communication network interface 313, a CPU 314, an input/output unit 315 and a memory 316. These components are connected to one another via a bus 310. The reader/writer interface 311 is used to transfer data with the reader/writer 320. The external storage unit interface 312 is used for data transfer with the external storage unit 340. The communication network interface 313 is used for data transfer with another terminal through the communication network 180. The CPU 314 has an arithmetic function and controls the overall operation of the service supplying unit 130. The input/output unit 315 includes a display for displaying various information, and a keyboard and a mouse for allowing the user to enter commands and data.

The memory 316 has an area 316a that stores a data transmitting and receiving program for data between a terminal and an IC card, an area 316b that stores a service supplying program, an area 316c that stores a communication program, an area 316d that stores a cryptographic program and a data storing area 316e. The memory 316 may be of a volatile type that loses the stored programs and data once power is turned off. The programs and data stored in the memory 316 are read from the external storage unit 340 such as a hard disk whenever necessary, and data that is required to be saved is written into the external storage unit 340.

The data transmitting and receiving program for data between a terminal and an IC card is used for data transfer between the terminal 300 and an IC card through the reader/writer 320. The service supplying program controls the overall operation performed when the authentication service described with reference to FIG. 1 (including the advance preparations) is supplied. The communication program is used for communication between the terminal 300 and other terminals through the communication network 180. The cryptographic program is used for cryptographic communication when various information is transferred with other terminals through the communication network 180.

The reader/writer 320 comprises a CPU 331, a reader/writer control program area 332, a terminal interface 333 and an IC card interface 334. These components are connected to one another through a bus 330. The CPU 331 controls the operation of the reader/writer 320 (various operations related to data transfer between the terminal 300 and the IC card 120 inserted into the reader/writer 320). The reader/writer control program to be executed by the CPU 331 is stored in the reader/writer program area 332. The terminal interface 333 is used for data transfer with the terminal 300. The IC card interface 334 is used for data transfer with the IC card inserted into the reader/writer 320.

Figure 4:
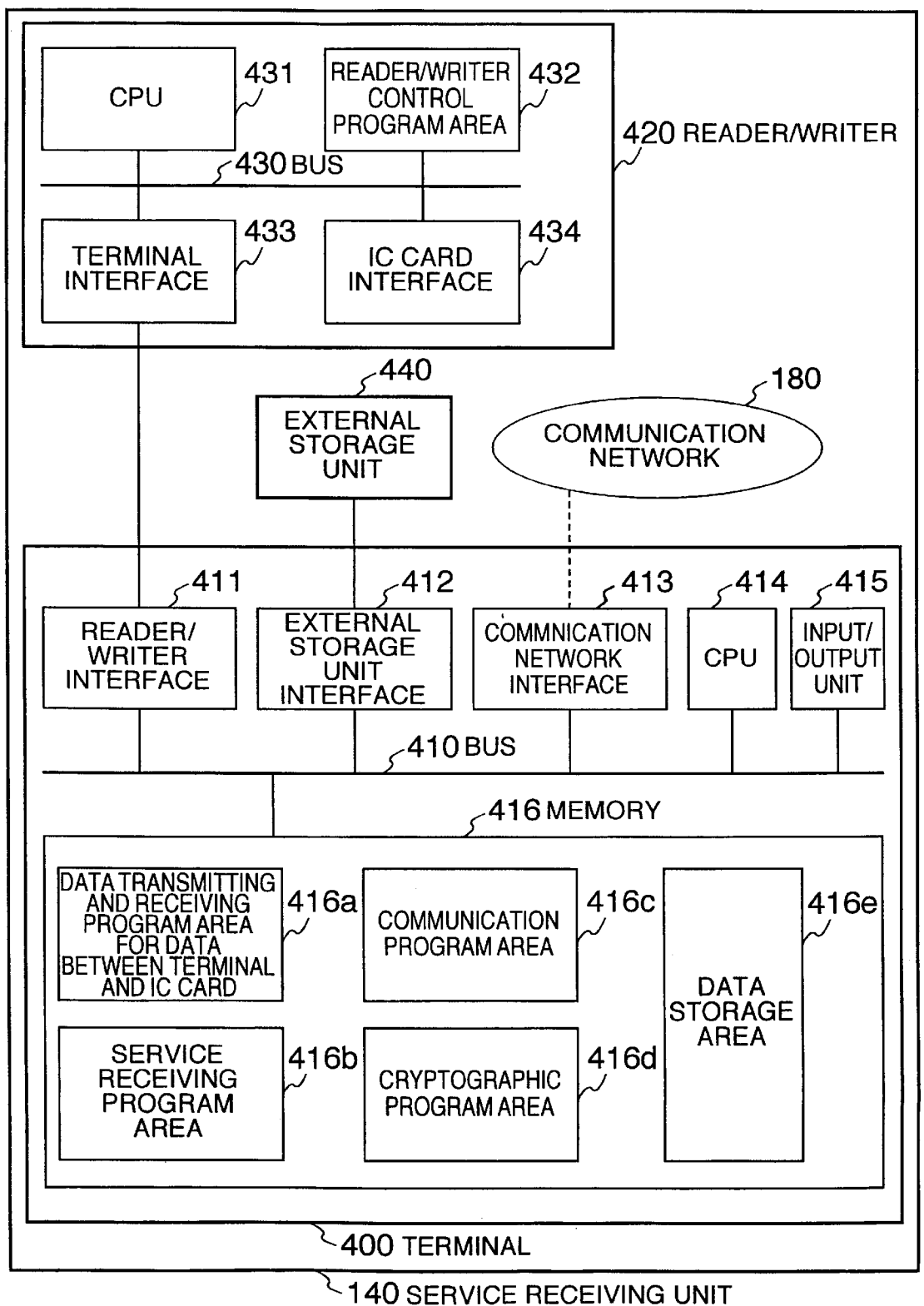
FIG. 4 is a diagram showing an internal structure of a service receiving unit used in the embodiment shown in FIG. 1.

FIG. 4 is a diagram showing an internal structure of the service receiving unit 140. The service receiving unit 141 is also identical in structure. Since the service receiving unit 140 has substantially the same structure as the service supplying unit 130 described with reference to FIG. 3, its description will be omitted. Reference numerals "3XX" denoting the components of the service supplying unit 130 should be read as reference numerals "4XX" for the service receiving unit 140. It may be noted, however, that the service supplying unit 130 shown in FIG. 3, being a unit for supplying authentication services, stores the service supplying program in the area 316b, while that the service receiving unit 140 shown in FIG. 4, being a unit for receiving authentication services, stores a service receiving program in an area 416b. The service receiving program controls the overall operation performed when the authentication service described with reference to FIG. 1 (including the advance preparations) is received.

Figure 5:
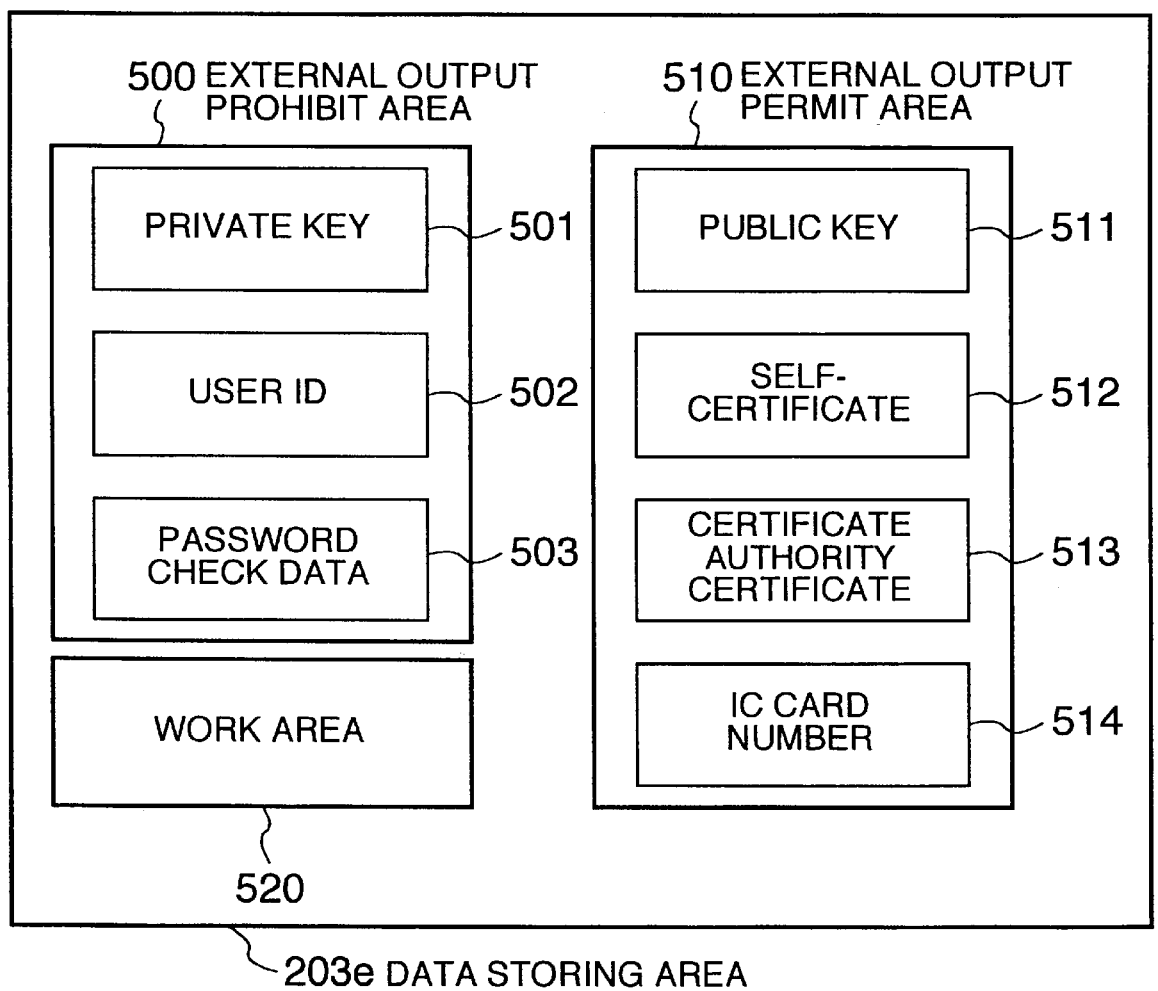
FIG. 5 is a block diagram showing what is stored in a data storing area in the service receiving unit used in the embodiment shown in FIG. 1.

FIG. 5 is a block diagram showing what is stored in the data storing area 203e of the IC card 120 described with reference to FIG. 2. The data storing area 203e includes an external output prohibit area 500, an external output permit area 510 and a work area 520. Data stored in the external output prohibit area 500 is used only within the IC card 120, and is thus prohibited from being delivered outside the IC card 120. Data stored in the external output permit area 510 is permitted to be delivered outside the IC card 120. The work area 520 is used when the CPU 202 of the IC card 120 executes arithmetic operation.

The external output prohibit area 500 stores a private key 501, a user ID 502 and password check data 503. The private key 501 is prepared and set by an authentic user of the IC card 120 and is, therefore, specific to the user. The user ID 502 is an identifier of the authentic user of the IC card 120. The password check data 503 is used to check whether a password entered when a user uses an IC card coincides with the password of the authentic user. The password check data 503 is not the password itself, but is set to a value obtained by rearranging the password using a unidirectional function. If security is not a decisive factor, a similar advantage can be obtained by using the password itself as the data 503.

The external output permit area 510 stores a public key 511 of the user, a self-certificate 512 that certifies the user, a certificate 513 that certifies that the certificate authority is an authentic organ, and an IC card number 514. The public key 511 is prepared and set by an authentic user of the IC card 120 and is, therefore, specific to the user (the public key is paired with the private key 501). The self-certificate 512 certifies that the holder of the certificate is the authentic user (himself) of the IC card 120 issued by the certificate authority 170. The self-certificate 512 includes the facts to be certified and the digital signature of the certificate authority 170. The facts to be certified include the public key of the authentic user of the IC card 120 and some pieces of information. The digital signature of the certificate authority 170 is prepared by enciphering a hashed element using the private key of the certificate authority 170 so as to be unforgeable, the hashed element being prepared by compressing the facts to be certified using a unidirectional function. The certificate 513 confirms the authenticity of the digital signature of the certificate authority 170 (the certificate 513 of the certificate authority is prepared by enciphering the public key of the certificate authority 170 using the private key of the organ 170). The IC card number 514 is a number unique to an IC card for discriminating such IC card from other IC cards.

Among the aforementioned data present in the IC card 120, data already stored in the IC card 120 when the certificate authority 170 issues the IC card 120 are the user ID 502, the password check data 503, the certificate 513 of the certificate authority and the IC card number 514. It may be noted that the data set as the password check data 503 when the IC card is issued corresponds to a tentative password set by the certificate authority 170 and therefore that the user can change such tentative password himself after receiving the card (the password check data 503 is changed upon change of a password).

In the system described with reference to FIG. 1, the procedure by which the service supplier 100 requests the certificate authority 170 to issue the IC card 121 may be considered the same as a general IC card issuing procedure.

The service supplier 100 prepares an IC card application form and sends the application form to the certificate authority 170. The certificate authority 170 receives the IC card application form and checks the applicant's identity. When the applicant's identity has been proven, the certificate authority 170 updates user management information and sends the IC card 121 to the service supplier 100. The service supplier 100 receives the IC card 121.

The user management information includes various information for managing a user to whom the certificate authority 170 issued an IC card and a certificate. Further, among the data stored in the IC card 121 described with reference to FIG. 5, the certificate authority 170 sets the ID that the user specified on his IC card application as the user ID 502 (or the certificate authority may specify the ID), sets the tentative password as the password check data 503, sets the public key of the certificate authority 170 as the certificate 513 of the certificate authority, and sets the number of that IC card as the IC card number 514. After setting these data, the certificate authority 170 sends the IC card to the user.

While the procedure by which the service supplier 100 requests the certificate authority 170 to issue the IC card 121 has been described, the procedure by which the service receivers 110 and 111 request the certificate authority 170 to issue their IC cards 122 and 123 is similar thereto.

FIG. 6 is a flowchart showing a procedure by which the service supplier 100 requests the certificate authority 170 to issue the certificate 153 online using his IC card 121 and the service supplying unit 130. In FIG. 6, the blocks below the item "IC CARD 121" indicate operations performed when the CPU 202 in the IC card 121 executes the program (FIG. 2) stored in the memory 203. It should particularly be noted that: the entire process is controlled by the IC card control program (203b); data transmission and reception between the service supplying unit 130 and the terminal 300 are effected by the data transmitting and receiving program for data between a terminal and an IC card (203a); and secret and public keys are generated by the cryptographic key generating program (203c). The blocks below the item "SERVICE SUPPLYING UNIT 130" indicate operations performed when the CPU 314 in the terminal 300 of the service supplying unit 130 executes the program (FIG. 3) stored in the memory 316. It should particularly be noted that: the entire process is controlled by the service supplying program (316b); data transmission and reception with the IC card 121 are effected by the transmitting and receiving program for data between a terminal and an IC card (316a); the enciphering and deciphering of messages at the time of message transmission and reception with the terminal of the certificate authority 170 are effected by the enciphering program (316d); and message transmission and reception with the terminal of the certificate authority 170 are effected by the communication program (316c). The blocks below the item "CERTIFICATE AUTHORITY 170" indicate operations performed by the terminal for issuing certificates arranged in the certificate authority 170.

The procedure shown in FIG. 6 is stared when the service supplier 100 inserts his IC card 121 into the reader/writer 320 connected to the service supplying unit 130 and performs a predetermined operation. First, in Step 700, the IC card 121 generates a private key and a public key based on an instruction from the service supplier 100, and stores the private key 501 and the public key 511 in the data storing area 203e (FIG. 5). Then, in Step 701, the IC card 121 sends the IC card number 514 and the generated public key 511 to the service supplying unit 130.

The service supplying unit 130 receives, in Step 702, the IC card number 514 and the public key 511. Then, in Step 703, the unit 130 prepares a certificate request message (including the IC card number 514, the public key 511 and other necessary information), enciphers the certificate request message in Step 704, and sends the enciphered certificate request message to the terminal of the certificate authority 170 in Step 705. While cryptographic communication is carried out between the service supplying unit 130 and the terminal of the certificate authority 170 as described above, it is supposed that the exchange (sharing) of the common key for such step precedes Step 705.

The terminal of the certificate authority 170 receives the enciphered certificate request message in Step 706 and deciphers the received enciphered message in Step 707. Then, in Step 708, the terminal checks the identity of the person who sent the message. When the identity has been proven, the terminal of the certificate authority 170 prepares a certificate by enciphering information such as the public key in the received certificate request message using the private key of the certificate authority 170 in Step 709. Then, the terminal enciphers the prepared certificate in Step 710 and sends the enciphered certificate to the service supplying unit 130 in Step 711.

The service supplying unit 130 receives the enciphered certificate in Step 712. The unit 130 then deciphers the enciphered certificate in Step 713 and transmits the deciphered certificate to the IC card 121 in Step 714. The IC card 121 receives the certificate in Step 715 and stores the received certificate in the self-certificate 512 area (FIG. 5) in the data storing area 203e.

While the procedure by which the service supplier 100 requests the issuance of a certificate has been described in FIG. 6, the procedure to be taken when the service receivers 110 and 111 request the certificate authority 170 to issue certificates is the same. That is, one may follow the procedure by replacing the IC card 121 with the IC card 122 or 123 and the service supplying unit 130 with the service receiving unit 140 or 141 in FIG. 6.

FIG. 7 shows a modified example of the IC card issuing procedure of FIG. 6. In FIG. 7, a user has the certificate authority 170 issued an IC card, prepares a key himself as the possessor of the issued IC card, and make an online request for the issuance of a certificate following the procedure shown in FIG. 6. However, the user may request the issuance of an IC card that has the keys and certificate already stored therein, following the procedure shown in FIG. 7.

In the procedure shown in FIG. 7, the service supplier 100 prepares an IC card application form in Step 800 and sends the IC card application form to the certificate authority 170 offline in Step 801. The certificate authority 170 receives the IC card application form in Step 802 and checks the identify of the applicant in Step 803. When the identity of the applicant has been proven, a private key and a public key are generated in the IC card 121 using the terminal of the certificate authority 170 in Step 804, and the private key 501 and the public key 511 are stored in the data storing area 203e (FIG. 5). Further, in Step 805, the IC card 121 transmits the generated public key to the terminal of the certificate authority 170. On the other hand, the terminal of the certificate authority 170 receives, in Step 806, the public key transmitted from the IC card 121, and prepares a certificate by enciphering the public key and other information using the private key of the certificate authority 170 in Step 807.

Then, the terminal transmits the prepared certificate to the IC card 121 in Step 808. The IC card 121 receives the certificate and stores the received certificate therein as the self-certificate 512 (FIG. 5) in Step 809. The certificate authority 170 updates the user management information in Step 810 and sends the prepared IC card 121 to the service supplier 100 in Step 811. The service supplier 100 receives the IC card 121 in Step 812.

It is supposed that the user ID 502, password check data 503, certificate 513 of the certificate authority and IC card number 514 corresponding to the applicant for the IC card are set in the IC card 121 by not shown process steps.

In the modified example shown in FIG. 7, the private key is disclosed to the certificate authority 170. However, if the certificate authority 170 is reliable, there arises no problem from this procedure, and thus the service supplier can take advantage of a simple process.

FIG. 8 is a flowchart showing an online authentication service procedure followed between the service supplier 100 and the service receivers 110 and 111 in the embodiment shown in FIG. 1. In FIG. 8, the blocks below the items "SERVICE RECEIVER 110" and "SERVICE RECEIVER 111" are operations performed when the CPUs 414 in the terminals 400 of the service receiving units 140 and 141 used by the service receivers 110 and 111 execute the program (FIG. 4) stored in the memories 416. It should particularly be noted that: the entire process is controlled by the service receiving program (416b); the enciphering and deciphering of data at the time of data transmission and reception (cryptographic communication) with the service supplying unit 130 are effected by the cryptographic program (416d); and data transmission and reception with the service supplying unit 130 are effected by the communication program (416c). The blocks below the item "SERVICE SUPPLIER 100" indicate operations performed when the CPU 314 in the terminal 300 of the service supplying unit 130 used by the service supplier 100 executes the program (FIG. 3) stored in the memory 316. It should particularly be noted that: the entire process is controlled by the service supplying program (316b); the enciphering and deciphering of data at the time of data transmission and reception (cryptographic communication) with the service receiving units 140 and 141 are effected by the cryptographic program (316d); and data transmission and reception with the service receiving units 140 and 141 are effected by the communication program (316c).

In Step 900a, the service receiver 110 enciphers a content of a contract using the service receiving unit 140 and transmits the enciphered data to the service supplying unit 130. The service supplying unit 130 receives and deciphers the content of the contract in Step 901a. In Steps 900b and 901b, the same process as the steps 900a and 901a is effected for the service receiver 111 between the service receiving unit 141 and the service supplying unit 130. Then, the service supplier 100 collates the content of the contract sent from the service receiver 110 with that sent from the service receiver 111 in Step 902. If the data sent from the service receivers 110 and 111 coincide with each other, the service supplier 100 prepares the contract information 160 (FIG. 1) by synthesizing the contents of the contract and other information into a predetermined form in Step 903. Then, in Steps 904a and 904b, the service supplier 100 enciphers the contract information 160 and transmits the enciphered information to the service receiving units 140 and 141 using the service supplying unit 130.

The service receiver 110 receives and deciphers the contract information 160 using the service receiving unit 140 in Step 905a. The service receiver 110 checks the contract information 160 in Step 906a and prepares the one party-signed contract information 161 (FIG. 1) in Step 907a if the checked information 160 is found out to be satisfactory, and enciphers the one party-signed contract information 161 and sends the enciphered information 161 to the service supplying unit 130 in Step 908a. The service supplying unit 130 receives and deciphers the one party-signed contract information 161 in Step 909a. How the one party-signed contract information 161 is prepared in Step 907a will be described in detail with reference to FIG. 10.

FIG. 9A shows a structure of the one party-signed contract information 161 prepared in Step 907a. The one party-signed contract information 161 includes the contract information 160, appended information 1000a and a signature 1001a. The appended information 1000a includes: information appended to the contract such as the date and time at which the service receiver 110 put his signature and the name of a person concerned with the contract; and a certificate of the service receiver 110 necessary to check the validity of the signature 1001a and a certificate of the certificate authority. The signature 1001a is prepared first by compressing data obtained by linking in a predetermined way the contract information 160 and the appended information 1000a in the order they are mentioned, and then by enciphering the thus obtained compressed data using the private key of the service receiver 110.

Returning to FIG. 8, Steps 905b to 908b, which are the same as the aforementioned Steps 905a to 908a, are executed for the service receiver 111. FIG. 9B shows a structure of one party-signed contract information 162 prepared by the service receiver 111. The structure shown in FIG. 9B is the same as that shown in FIG. 9A except that appended information 1000b and a signature 1001b belong to the service receiver 111. The service supplying unit 130 receives and deciphers the one party-signed contract information 162 prepared by the service receiver 111 in Step 909b.

Then, in Step 910, the service supplier 100 prepares three parties-signed contract information 163 using the service supplying unit 130 and stores the prepared information 163 in the external storage unit 340. How the three parties-signed contract information 163 is prepared will be described in detail with reference to FIG. 11.

FIG. 9C shows a structure of the three parties-signed contract information 163. The three parties-signed contract information 163 includes the contract information 160, the appended information 1000a, appended information 1000b, appended information 1000c and the digital signature 1001a, a digital signature 1001b and a digital signature 1001c. The contract information 160 is the information included in the one party-signed contract information 161 and 162. The appended information 1000a and the signature 1001a are the information included in the one party-signed contract information 161, and the appended information 1000b and the signature 1001b are the information included in the one party-signed contract information 162. The appended information 1000c is the information appended by the service supplier 100. The signature 1001c is prepared first by compressing data obtained by linking in a predetermined way the contract information 160 and the appended information 1000a, 1000b and 1000c in the order they are mentioned, and then by enciphering the thus obtained compressed data using the private key of the service supplier 100.

According to the thus structured three parties-signed contract information 163, a user can have various information relevant to the contract such as the content of the contract, the names of the contracting parties, the dates and times at which the contracting parties put their signatures, the name of the authentication service supplier, the date and time at which the supplier put his signature by referring to the contract information 160 and the appended information 1000a, 1000b and 1000c. Further, it is confirmed by referring to the signature 1001a and the signature 1001b that the service receivers 110 and 111 truly signed the contract information 160 (and the appended information). Still further, it is confirmed by referring to the signature 1001c that the authentication service supplier 100 authenticates the fact that the contract has been concluded and is valid. Since the contract information 160, the appended information 1000a, 1000b and 1000c and the signatures 1001a, 1001b and 10001c are linked in a simple manner, the user can unlink the data and check only the signature 1001a or the signature 1001b.

Returning to FIG. 8 again, after Step 910, the service supplying unit 130 enciphers the three parties-signed contract information 163 and transmits the enciphered information 163 to the service receiving units 140 and 141 in Steps 911a and 911b. The service receiving units 140 and 141 receive and decipher the three parties-signed contract information 163 in Steps 912a and 912b, respectively. The received three parties-signed contract information 163 are held by the service receivers 110 and 111.

While cryptographic communication is carried out between the service supplying unit 130 and the service receiving units 140 and 141 as described above, the exchange (sharing) of the common key for this step has already been effected in the advance process to be performed prior to the process shown in FIG. 8.

FIG. 10 is a flowchart showing the procedure for preparing the one party-signed contract information 161 shown by Step 907a in FIG. 8. In FIG. 10, the blocks below the item "SERVICE RECEIVING UNIT 140" indicate operations performed when the CPU 414 in the terminal 400 of the service receiving unit 140 executes the program (FIG. 4) stored in the memory 416. It should particularly be noted that: the entire process is controlled by the service receiving program (416b), and data transmission and reception with the IC card 122 are effected by the data transmitting and receiving program for data between a terminal and an IC card (416a). The blocks below the item "IC CARD 122" indicate operations performed when the CPU 202 in the IC card 122 executes the program (FIG. 2) stored in the memory 203. It should particularly be noted that: the entire process is controlled by the IC card control program (203b); data transmission and reception with the terminal 400 of the service receiving unit 140 are effected by the data transmitting and receiving program for data between a terminal and an IC card (203a); and the signature is generated by the signature generating program (203d).

First, in Step 1100, the service receiving unit 140 transmits a certificate output request message to the IC card 122. The IC card 122 receives the certificate output request message in Step 1101 and transmits the self-certificate 512 and the certificate 513 of the certificate authority in Step 1102. The service receiving unit 140 receives these certificates in Step 1103 and generates the appended information 1000a in Step 1104. The appended information 1000a is generated by linking the received certificates and the information appended to the contract (e.g., the date and time at which the contract was signed and the name of the service receiver 110) in a predetermined order. Then, in Step 1105, data obtained by linking the contract information 160 and the appended information 1000a in the order they are mentioned is compressed to generate a hashed element. In Step 1006, the hashed element is transmitted to the IC card 122.

The IC card 122 receives the hashed element in Step 1107 and generates the signature 1001a by enciphering the hashed element using the private key 501 (of the service receiver 110) in the IC card 122 in Step 1108. The IC card 122 transmits the signature 1001a to the service receiving unit 140 in Step 1109. The service receiving unit 140 receives the signature 1001a in Step 1110 and links the contract information 160, the appended information 1000a, and the signature 1001a in the order they are mentioned to generate the one party-singed contract information 161 shown in FIG. 9A in Step 1111.

It may be noted that the same procedure as that of FIG. 10 is taken in Step 907b; provided, however, that it is the one party-signed contract information 162 shown in FIG. 9B for the service receiver 111 that is generated in Step 907b.

Figure 11:
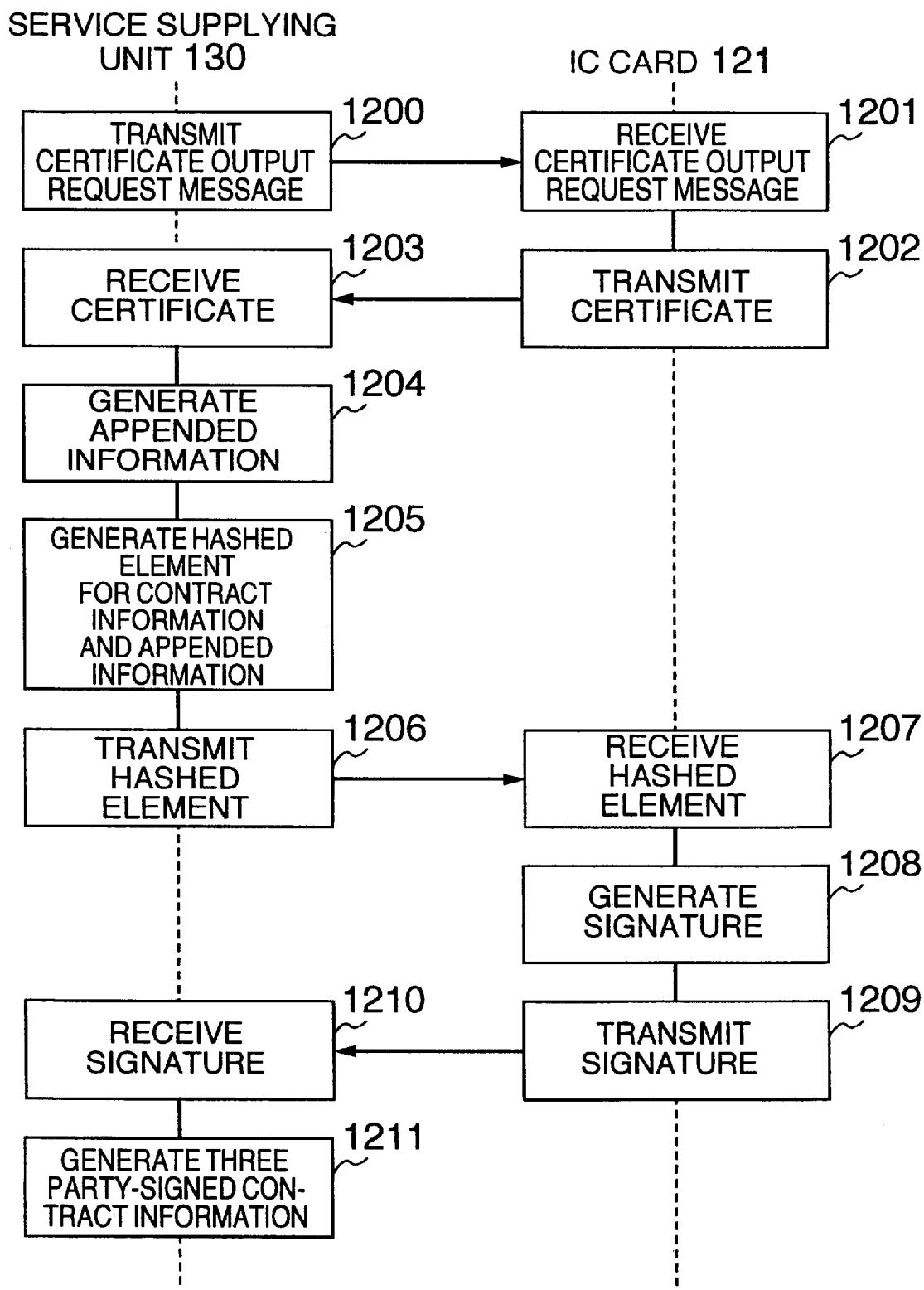
FIG. 11 is a flowchart showing the details of a procedure for generating contract information signed by three parties with the service supplying unit and the IC card cooperating with each other in the embodiment shown in FIG. 1.

FIG. 11 is a flowchart showing the procedure for preparing the three parties-signed contract information 163 shown by Step 910 in FIG. 8. In FIG. 11, the blocks below the item "SERVICE SUPPLYING UNIT 130" indicate operations performed when the CPU 314 in the terminal 300 of the service supplying unit 130 executes the program (FIG. 3) stored in the memory 316. It should particularly be noted that: the entire process is controlled by the service supplying program (316b); and data transmission and reception with the IC card 121 are effected by the data transmitting and receiving program for data between a terminal and an IC card (316a). The blocks below the item "IC CARD 121" indicate operations performed when the CPU 202 in the IC card 121 executes the program (FIG. 2) stored in the memory 203. It should particularly be noted that: the entire process is controlled by the IC card control program (203b); data transmission and reception with the terminal 300 of the service supplying unit 130 are effected by the data transmitting and receiving program for data between a terminal and an IC card (203a); and the signature is generated by the signature generating program (203d).

First, in Step 1200, the service supplying unit 130 transmits a certificate output request message to the IC card 121. The IC card 121 receives the certificate output request message in Step 1201 and transmits the self-certificate 512 and the certificate 513 of the certificate authority in Step 1202. The service supplying unit 130 receives these certificates in Step 1203 and generates the appended information 1000c in Step 1204. The appended information 1000c is generated by linking the received certificates and the information appended to the contract (e.g., the date and time at which the contract was signed and the name of the service supplier 100) in a predetermined order. Then, in Step 1205, data obtained by linking the contract information 160 and the appended information 1000a, the appended information 1000b and the appended information 1000c and the signatures 1001a and the signature 1001b in the order they are mentioned is compressed to generate a hashed element. In Step 1206, the hashed element is transmitted to the IC card 121.

The IC card 121 receives the hashed element in Step 1207 and generates the signature 1001c by enciphering the hashed element using the private key 501 (of the service supplier 100) in the IC card 121 in Step 1208. The IC card 121 transmits the signature 1001c to the service supplying unit 130 in Step 1209. The service supplying unit 130 receives the signature 1001c in Step 1210 and links the contract information 160, the appended information 1000a, the appended information 1000b and the appended information 1000c, and the signature 1001a, the signature 1001b and the signature 1001c in the order they are mentioned to generate the three parties-signed contract information 163 shown in FIG. 9C in Step 1211.

According to the electronic authentication service, which is the embodiment shown in FIG. 1, online authentication services related to contracts for commercial transactions can be implemented.

Another embodiment of the present invention will be described next. Since many structural and procedural aspects of this embodiment are shared in common with the embodiment shown in FIG. 1, aspects different from the embodiment shown in FIG. 1 will be mainly described, omitting the description of common aspects.

In the embodiment shown in FIG. 1, the date and time at which the service receiver 110 put his signature is included in the appended information 1000a (FIG. 9A), the date and time at which the service receiver 111 put his signature is included in the appended information 1000b (FIG. 9B), and the date and time at which the service supplier 100 put his signature is included in the appended information 1000c (FIG. 9C). However, such date and time data are obtained based on the clocks built in the service receiving units 140 and 141 and the service supplying unit 130. If the built-in clocks indicate incorrect time, date and time data are erroneous to an objectionable degree. Further, there is a danger that some service receiver will set incorrect date and time data intentionally. Since when the contract took effect may become a source of dispute in performing various contracts, it is desired that date and time data be set correctly. To ensure that a correct date and time is set in the appended information, this embodiment is specially designed to allow a time management authority to manage the standard time.

Figure 12:
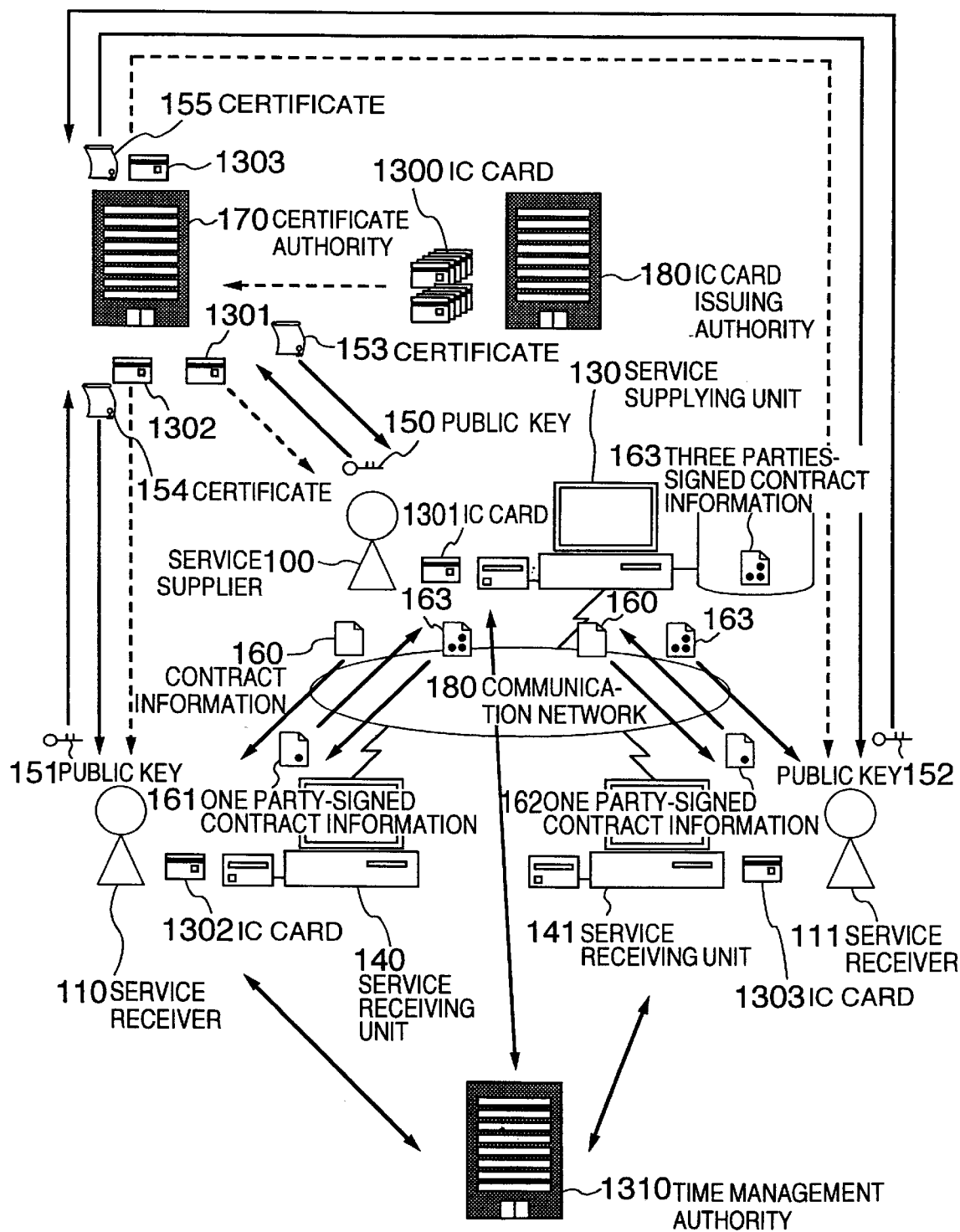
FIG. 12 is a diagram showing a configuration of an electronic authentication system, which is another embodiment of the present invention.

FIG. 12 is a diagram showing a configuration of an electronic authentication system according to this embodiment. In FIG. 12, components common to the system shown in FIG. 1 are denoted by the same reference numerals and their description will be omitted. The system shown in FIG. 12 is distinguished from that shown in FIG. 1 in that IC cards 1300 to 1303, each having a built-in clock, are used instead of the IC cards 120 to 123 and that a time management authority 1310 is arranged to manage the standard time. With this arrangement, the built-in clock in each IC card is adjusted based on the standard time managed by the time management authority 1310 when a signature is generated within the IC card, and thus date and time data in the appended information can be set based on the standard time indicated by the adjusted built-in clock.

Each of the IC cards 1301 to 1303 used in the system shown in FIG. 12, although being substantially identical in structure with the IC card 120 shown in FIG. 2, has a built-in clock 204 shown by a broken line in FIG. 2. Further, an IC card control program for executing another procedure is stored in an area 203b of the memory 203 instead of the IC card control program shown in FIG. 2.

In the embodiment shown in FIG. 12, the IC card issuing procedure, the procedure for causing the certificate authority 170 to issue the certificates 153 to 155, and the authentication service procedure are the same as those shown in FIGS. 6 to 8. While the structure of each of the signed contract information 161 to 163 is basically the same as that shown in each of FIGS. 9A to 9C, the former differs from the latter in that the "standard time" is inserted before each "signature."

In the embodiment shown in FIG. 12, the IC card 1302 transmits a standard time request message to the service receiving unit 140 after Step 1107 of FIG. 10. The service receiving unit 140 receives the standard time request message and obtains the standard time. The standard time is obtained first by transmitting online a standard time request message to the time management authority 1310 shown in FIG. 12 and then by receiving the standard time returned from the time management authority 1310. The obtained standard time is transmitted from the service receiving unit 140 to the IC card 1302. The IC card 1302 receives the standard time and adjusts the built-in clock 1400 based on the received standard time.

Then, the IC card 1302 generates the signature 1001a by enciphering data using the private key 501 (of the service receiver 110) in the IC card 1302. The data is obtained by linking a hashed element (the data already received in Step 1107) with the standard time (the time at this point, which will hereinafter be referred to as "standard time a") of the built-in clock 1400 in the order they are mentioned. The IC card 1302 then transmits the standard time a and the generated signature 1001a to the service receiving unit 140. The service receiving unit 140 receives the standard time a and the signature 1001a, and generates the one party-signed contract information 161 by linking the contract information 160, the appended information 1001a, the standard time a and the signature 1001a in the order they are mentioned.

It may be noted that, in the embodiment shown in FIG. 12, the procedure for generating the one party-signed contract information 162 for the service receiver 111 is similar to the aforementioned procedure. That is, the one party-signed contract information 162 is the data obtained by linking the contract information 160, the appended information 1000b, a standard time b and the signature 1001b in the order they are mentioned. The standard time b is the standard time used for generating the signature of the service receiver 111.

Further, similarly to the aforementioned procedure, the procedure for generating the three parties-signed contract information 163 in the embodiment shown in FIG. 12 involves the step in which the service supplying unit 130 obtains the standard time from the time management authority 1310 in response to a standard time request from the IC card 1301.

In the electronic authentication system according to the embodiment shown in FIG. 12, the correct date and time at which the contract was signed can be included in the contract information using the standard time that is managed by the time management authority 1310. Therefore, the date and time at which the contract was concluded can be clarified, and thus any dispute possibly arising from an ambiguous contracting date can be well accommodated.

While the standard times a, b and c are stored separately from the appended information in the aforementioned embodiment, the standard times may also be included in the appended information. To do so, the standard times are obtained before the appended information generating step is taken, and the appended information may be generated so as to include the obtained standard times. Further, while the IC card 120 comprises the built-in clock 204, the built-in clock 204 may be omitted by allowing the received standard times to be directly used.

In the description of the aforementioned embodiment, the built-in clock 204 within each of the IC cards 1301 to 1303 is adjusted based on the standard times managed by the time management authority 1310, so that the dates and times at which the contract was signed based on the standard times are recorded correctly. However, the adjustment of the clocks 204 built in the IC cards 1301 to 1303 is basically made through the service supplying unit 130, and the service receiving units 140 and 141. Therefore, there is a danger that the standard time will be altered by modifying the service supplying unit 130 and the service receiving units 140 and 141. In this case, it may be so designed that the clocks built in the IC cards can be adjusted without involving the service supplying unit 130 and the service receiving units 140 and 141.

In FIG. 12, each of the IC cards 1300 to 1303 may have a built-in radio receiver. The standard time from the time management authority 1310 is sent via radio transmission, and the transmitted standard time is directly received by the IC cards 1300 to 1303 via radio reception so that the built-in clocks in the IC cards can be adjusted.

Each of such IC cards, being substantially identical in structure with the IC card 120 shown in FIG. 2, has a radio receiver 205 shown by a broken line in addition to the built-in clock 204. Further, an IC card control program for executing another procedure is stored in the area 203b of the memory 203 instead of the IC card control program. In this case, the IC card issuing procedure, the procedure for causing the certificate authority 170 to issue the certificates 153 to 155, the authentication service procedure and the structures of the signed contract information 161 to 163 are the same as those in the embodiment shown in FIG. 12.

With the aforementioned modification, the standard time managed by the time management authority 1310 can be sent directly to each of the IC cards 1301 to 1303 from the time management authority 1310 via radio transmission without involving the service supplying unit 130 and the service receiving units 140 and 141. Therefore, this system prohibits the service supplying unit 130 and the service receiving units 140 and 141 from illegally altering the dates and times, so that the correct date and time at which the contract was signed can be included in the corresponding contract information.

Then, another embodiment of the present invention will be described. Since many structural and procedural aspects of a system according to this embodiment are shared in common with those of the embodiment shown in FIG. 1, aspects different from the embodiment shown in FIG. 1 will be mainly described, omitting the description of common aspects.

Figure 13:
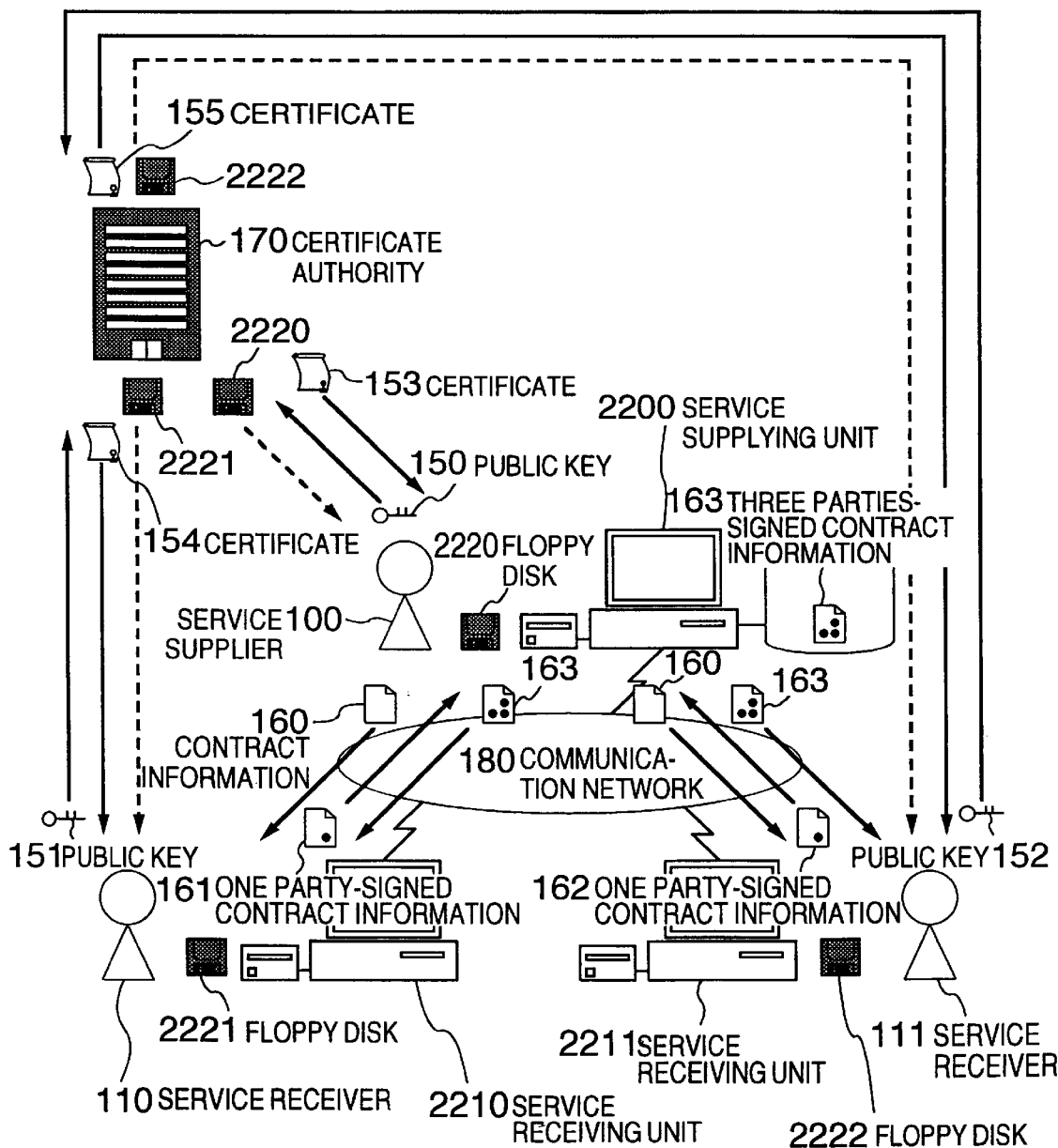
FIG. 13 is a diagram showing a configuration of an electronic authentication system, which is another embodiment of the present invention.

FIG. 13 is a diagram showing a configuration of an electronic authentication system according to this embodiment. In FIG. 13, components common to the system shown in FIG. 1 are denoted by the same reference numerals and their description will be omitted. The system shown in FIG. 13 is distinguished from that shown in FIG. 1 in that there is no IC card issuing authority 180 and that floppy disks 2220 to 2222 are used instead of the IC cards 120 to 123. It may be noted that any storing media other than floppy disks can be used.

A service supplying unit 2200 shown in FIG. 13 is substantially the same as the service supplying unit 130 shown in FIG. 3, but does not have a reader/writer and a reader/writer interface and has in the terminal thereof a memory whose internal structure is different. The memory in the terminal has an area that stores a service supplying program, an area that stores a communication program, an area that stores a cryptographic program, a data storing area that stores various work data, an area that stores a cryptographic key generating program and an area that stores a signature generating program. While the cryptographic key generating program and the signature generating program have functions similar to those stored in the IC card 120 according to the embodiment shown in FIG. 1, these programs are stored in the service supplying unit 2200, since the floppy disks are used instead of IC cards. The structure of service receiving units 2210 and 2211 is also similar.

Figure 14:
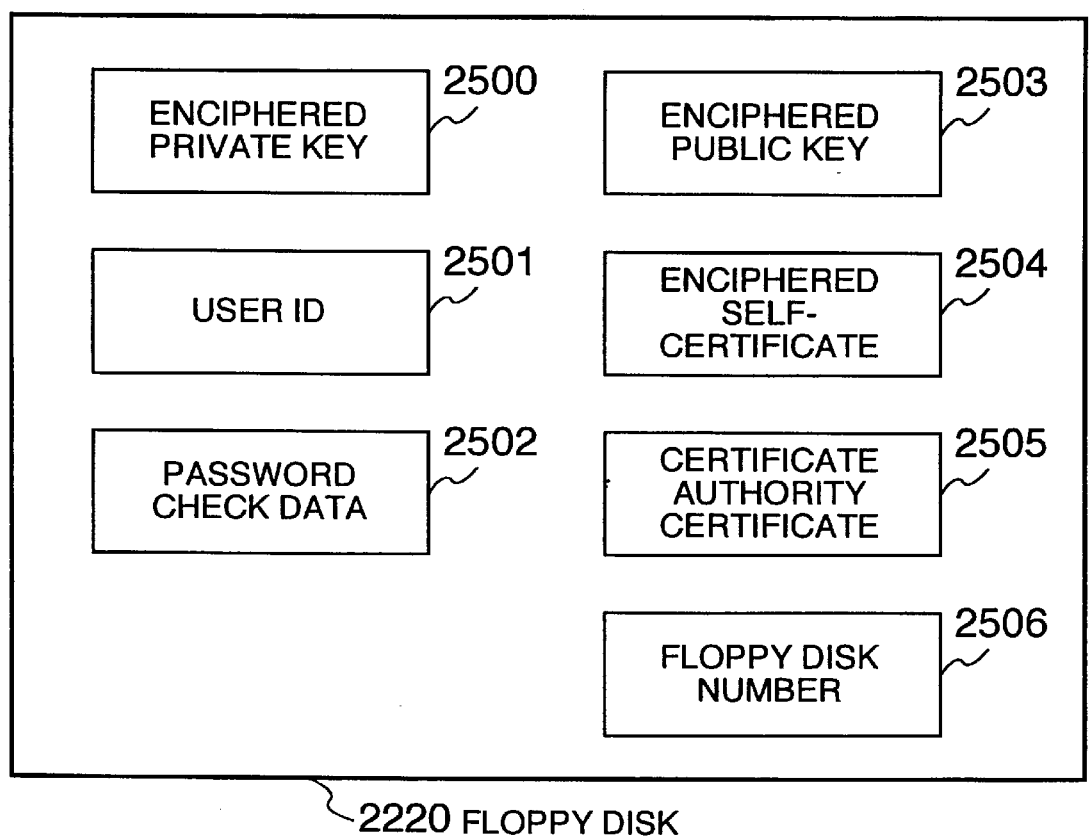
FIG. 14 is a block diagram showing what is in a floppy disk used in the embodiment shown in FIG. 13.

FIG. 14 is a block diagram showing what is stored in a floppy disk 2220 shown in FIG. 13. The floppy disk 2220 stores an enciphered private key 2500, a user ID 2501, password check data 2502, an enciphered public key 2503, an enciphered self-certificate 2504, a certificate authority certificate 2505 and a floppy disk number 2506. These information are similar to the information stored in the data storing area 203e of the IC card 120 described with reference to FIG. 5. However, considering the fact that information can be read from floppy disks more simply than from IC cards, the private key 2500, the public key 2503 and the self-certificate 2504 are enciphered using the password of an authentic user of the floppy disk 2220 as a key. That is, to use this floppy disk 2220, the following procedure is required to be followed.

When using the floppy disk 2220, the system requires that the user enter his user ID and password. The entered user ID is collated with the user ID 2501, and the entered password is collated with the password check data 2502 via a predetermined directional compressing function. When the user is identified as the authentic user as a result of the collations, the password is stored in the work area in the terminal. Thereafter, upon reading of the enciphered private key 2500, the enciphered public key 2503 or the enciphered self-certificate 2504 whenever necessary, the read information is deciphered using the stored password to obtain the private key, the public key or the self-certificate.

While the floppy disk 2220 has been described above, the same applies to the floppy disks 2221 and 2222.

In the embodiment shown in FIG. 13, a procedure by which the service supplier 100 requests the certificate authority 170 to issue the floppy disk 2220 is similar to the IC card issuing procedure in the embodiment shown in FIG. 1.

The same applies to the procedure by which the service receivers 110 and 111 request the certificate authority 170 to issue the floppy disks 2221 and 2222.

Among the data stored in the floppy disk 2220 described with reference to FIG. 14, the certificate authority 170 sets the ID written by the user in his floppy disk application form (or the ID that is specified by the certificate authority) as the user ID 2501, sets tentative password check data as the password check data 2502, sets the public key of the certificate authority as the certificate authority certificate 2505, and sets the number of that floppy disk as the floppy disk number 2506, and then sends the floppy disk to the user.

Figure 15:
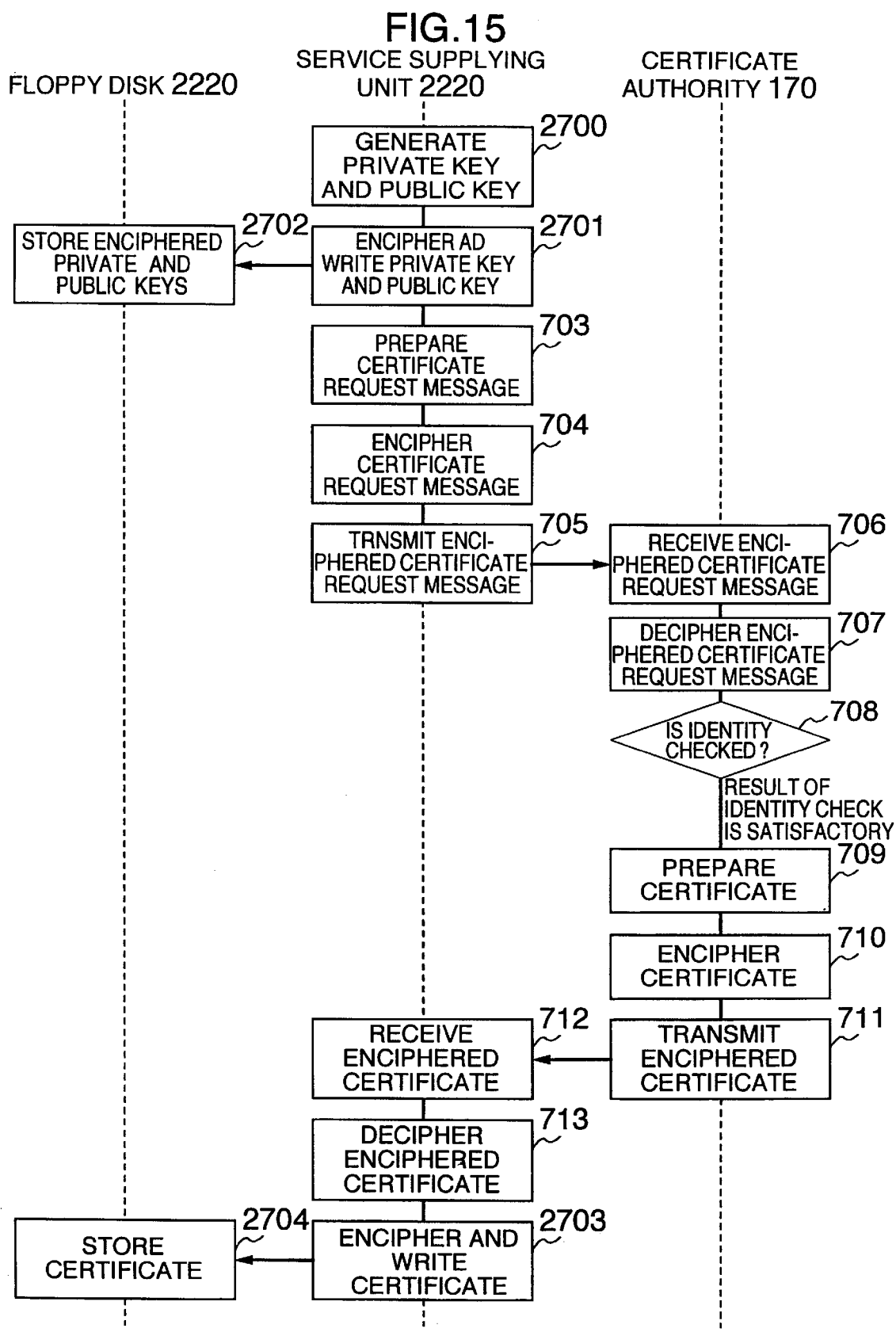
FIG. 15 is a flowchart showing a procedure by which a service supplier requests a certificate authority to issue a certificate using his IC card and a service supplying unit in the embodiment shown in FIG. 13.

FIG. 15 is a flowchart showing a procedure by which the service supplier 100 requests the certificate authority 170 to issue the certificate 153 online using his floppy disk 2220 and the service supplying unit 2200 in the embodiment shown in FIG. 13. In FIG. 15, the blocks below the item "FLOPPY DISK 2220" indicate access to the floppy disk 2220. The blocks below the item "SERVICE SUPPLYING UNIT 2200" indicate operations performed when the CPU in the terminal of the service supplying unit 2200 executes a program in a memory. It should particularly be noted that: the entire process is controlled by the service supplying program (316b); the enciphering and deciphering of messages at the time of message transmission and reception (cryptographic communication) with the terminal of the certificate authority 170 are effected by the enciphering program (316d); message transmission and reception with the terminal of the certificate authority 170 are effected by the communication program (316c); and the cryptographic keys are generated by a cryptographic key generating program. The blocks below "CERTIFICATE AUTHORITY 170" indicate operations performed by the terminal that is provided at the certificate authority 170 for issuing certificates.

The procedure of FIG. 15 starts with the service supplier 100 inserting his floppy disk 2220 into the service supplying unit 2200 and performing a predetermined operation. First, the service supplying unit 2200 generates a private key and a public key based on an instruction from the service supplier 100 in Step 2700, and enciphers the private key and the public key using a password and writes the enciphered keys into the floppy disk 2220 in Step 2701. The floppy disk 2220 stores the enciphered private key and the enciphered public key in predetermined areas 2500 and 2503 shown in FIG. 14, respectively, in Step 2702.

The process in Steps 703 to 713 is the same as that in Steps 703 to 713 in FIG. 6. As a result of this process, the service supplying unit 2200 obtains the certificate from the certificate authority 170. In Step 2703, the certificate is enciphered using the password and the enciphered certificate is written into the floppy disk 2220. In Step 2704, the floppy disk 2220 stores the enciphered certificate in a predetermined area 2504 shown in FIG. 14.

While the procedure by which the service supplier 100 requests the issuance of a certificate has been described in FIG. 15, a procedure by which the service receivers 110 and 111 request the issuance of certificates is similar.

In the embodiment shown in FIG. 13, the online authentication service procedure to be followed between the service supplier 100 and the service receivers 110 and 111 is similar to the procedure described with reference to the embodiment shown in FIG. 8. It may be noted, however, that, as shown in FIGS. 10 and 11, the procedure shown in FIG. 8 involves the use of IC cards to generate the one party-signed contract information on the part of the service receivers 110 and 111 in Steps 907a and 907b and to generate the three party-signed contract information on the part of the service supplier 100 in Step 910, but that, in the embodiment shown in FIG. 13, in which floppy disks are used in place of IC cards, the contract information preparing procedure is different.

With respect to the embodiment shown in FIG. 13, the procedure for preparing the one party-signed contract information such as shown by Step 907a in FIG. 8 will be described. The service receiving unit 2210 reads the enciphered private key 2500, the enciphered self-certificate 2504 and the certificate authority certificate 2505 from the floppy disk 2221. The enciphered private key 2500 and self-certificate 2504 that were read are deciphered using the password. Then, the appended information 1000a is generated. The appended information 1000a is generated by linking the self-certificate, the certificate authority certificate and information appended to the contract (e.g., the date and time at which the contract was signed and the name of the service receiver 110) in a predetermined order. Then, data obtained by linking the contract information 160 and the appended information 1000a in the order they are mentioned is compressed to generate a hashed element. The signature 1001a is prepared by enciphering the hashed element using the private key. The contract information 160, the appended information 1000a and the signature 1001a are linked in the order they are mentioned to generate the one party-signed contract information 161 shown in FIG. 9A.

The procedure such as shown in Step 907b is similar as well. However, in Step 709b, the one party-signed contract information 162 shown in FIG. 9B for the service receiver 111 is generated.

In the embodiment shown in FIG. 13, the procedure for preparing the three parties-signed contract information such as shown by Step 910 in FIG. 8 can similarly be taken.

According to the embodiment shown in FIG. 13, online authentication service using inexpensive floppy disks can be implemented.

Then, another embodiment of the present invention will be described. While authentication service systems using IC cards have been described in the aforementioned embodiments, the embodiment to be described below can be deemed as a modification of the aforementioned embodiments and therefore only aspects that are different from those of the aforementioned embodiments will be described, omitting the description of the aspects shared in common.

In this embodiment, it is presupposed that the keys and certificates of parties involved are updated at a predetermined interval. As a result, security of the keys can be improved. However, if the keys and certificates that have previously been used are discarded, the users encounter inconvenience in that the signatures generated using the discarded keys cannot be checked and certified. To overcome such inconvenience, this embodiment is designed to save the previously used keys and certificates in the IC card.

Figure 16:
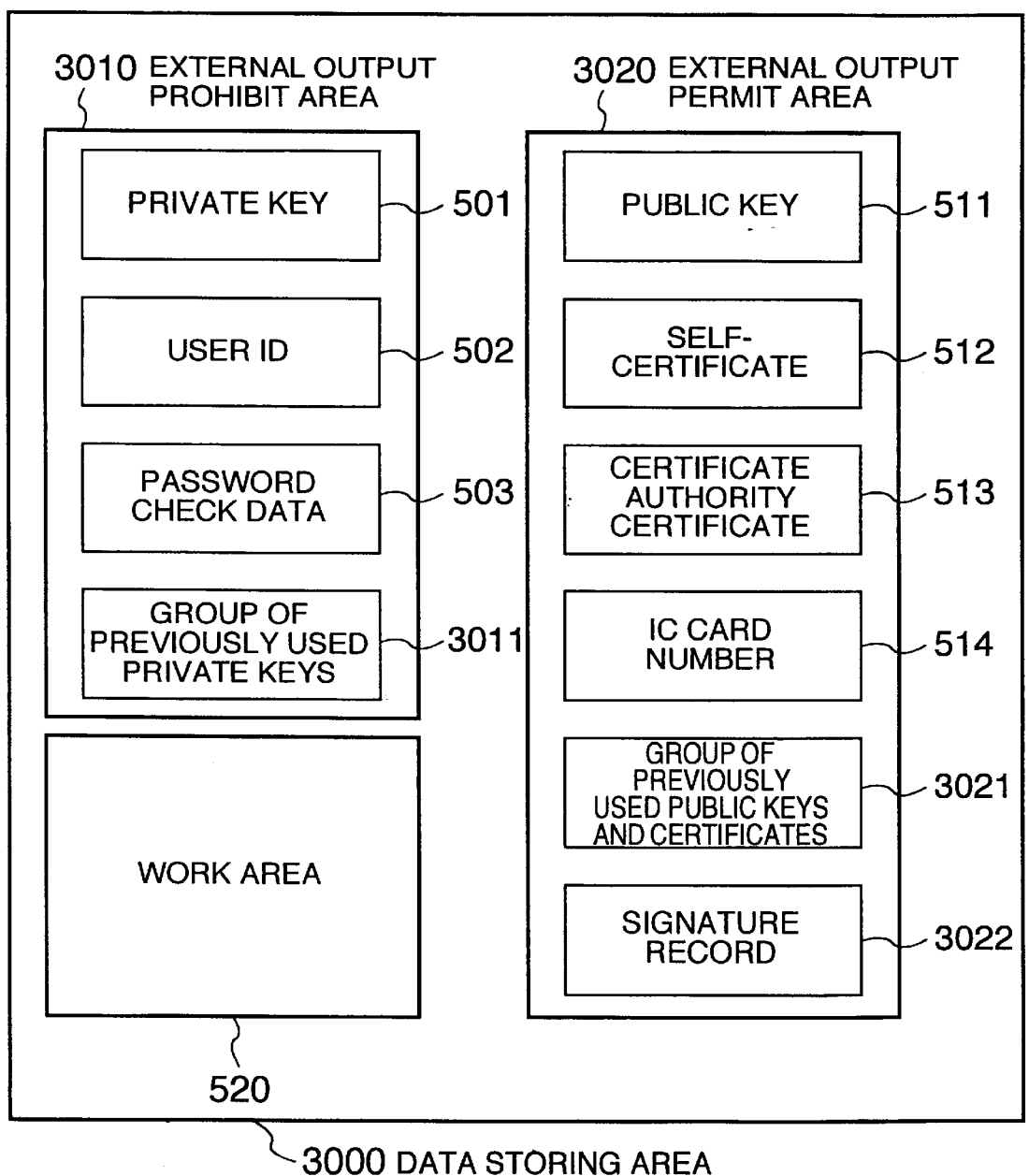
FIG. 16 is a diagram showing an internal structure of an IC card, which is another embodiment of the present invention.

FIG. 16 shows what is stored in a data storing area 3000 of an IC card according to this embodiment. In FIG. 16, the same information and areas as those in FIG. 5 are denoted by the same reference numerals and their description will be omitted. In this IC card, an area for storing a signature record 3022 is provided, and when a user puts h is signature, a record indicating the date and time at which and the key and certificate with which the user put his signature are saved. When the private key 501, the public key 511, the self-certificate 512 and the certificate 513 of the certificate authority are updated, the signature record 3022 is referred to and the private key 501, the public key 511, the self-certificate 512 and the certificate 513 of the certificate authority are saved in areas 3011 and 3021 if the user thinks it necessary to save these pieces of information (i.e., if the user thinks he will have to check the signatures using such keys and certificates in the future).

According to the IC card in the embodiment shown in FIG. 16, the previously used keys and certificates are saved. Therefore, a signature can be checked and certified using the previously used keys. Further, if the user confirms that he no longer has to check and certify a document to which he put his signature using such keys by referring to the signature record 3022, he may simply delete the previously used keys and certificates.

Then, another embodiment of the present invention will be described. In the system according to each of the aforementioned embodiments, the single certificate authority 170 performs the operation of issuing IC cards, floppy disks and certificates. On the other hand, a system according to this embodiment has the feature that there are two certificate authorities: an individual certification authority for certifying an individual and a membership certification authority for certifying a member.

Figure 17:
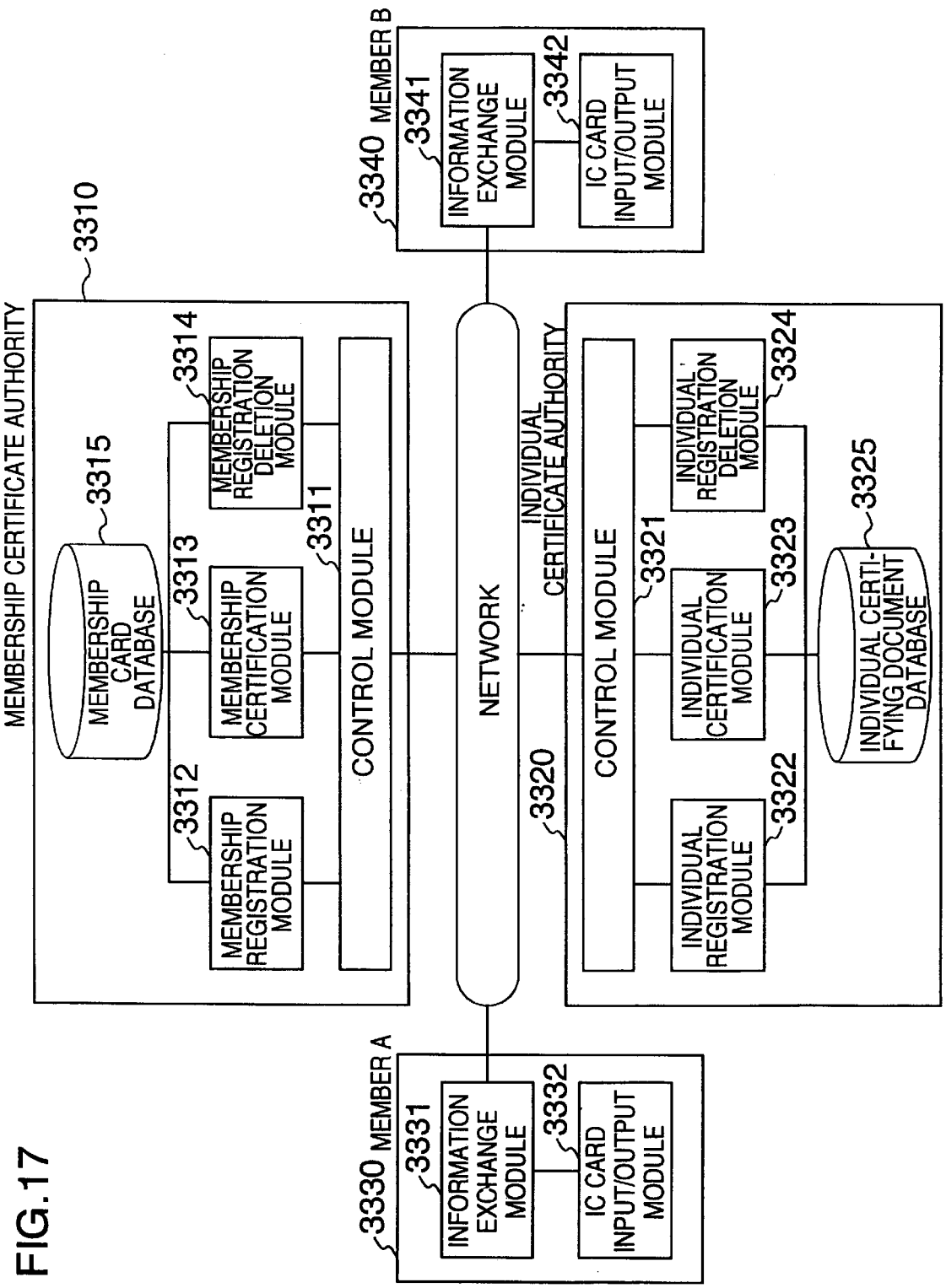
FIG. 17 is a diagram showing a configuration of a system, which is another embodiment of the present invention.

FIG. 17 shows a configuration of the system according to this embodiment. A terminal 3310 of the membership certification authority, a terminal 3320 of the individual certification authority, a terminal 3330 of a member A and a terminal 3340 of a member B are connected to one another through a network. The network is an open network environment such as Internet.

The individual certification authority certifies that the public key of an individual is authentic and possessed by the individual himself, and performs a process for issuing, archiving and invalidating a certificate (individual certifying document) certifying that the public key of the individual is authentic and possessed by the individual himself. The individual certification authority also responds to inquiries about the validity of an individual certifying document. Registration to the individual certification authority may be equivalent to resident registration, and such registration may be administered by, e.g., a public entity.

In FIG. 17, the terminal 3320 of the individual certification authority comprises a control module 3321, an individual registration module 3322, an individual certification module 3323, an individual registration deletion module 3324 and an individual certifying document data base 3325. The control module 3321 performs a process for properly branching process steps based on the application of an applicant. The individual registration module 3322 performs a process for examining the authenticity of an individual based on the application of an applicant and issuing an individual certifying document. The individual certification module 3323 performs a process for checking the validity of the individual certifying document at the request of an applicant and informing the applicant of the result. The individual registration deletion module 3324 performs a process for deleting the individual registration at the request of an applicant. The individual certifying document database 3325 is used for archiving the public keys and other information of individuals.

The membership certification authority certifies that the public key of an individual who is entitled to membership of a predetermined organization or the like is possessed by the individual himself who is entitled to membership, and issues, archives and invalidates a membership card that certifies this fact. Further, the membership certification authority responds to inquiries about the validity of a membership card. Unlike the individual certification authority that would function as a public organ for undertaking resident registration, the membership certification authority would function as an organ for certifying that an individual is an authentic member of, e.g., a credit card.

In FIG. 17, the terminal 3310 of the membership certification authority comprises a control module 3311, a membership registration module 3312, a membership certification module 3313, a membership registration deletion module 3314 and a membership card database 3315. The control module 3311 performs a process for properly branching process steps based on the application of an applicant made through a network. The membership registration module 3312 performs a process for testing the qualifications for membership based on the application of an applicant and issuing a membership card when it is found out that the applicant, is qualified as a member. The membership certification module 3313 performs a process for checking the validity of a membership card at the request of an applicant and notifying the applicant of the result. The membership registration deletion module 3314 performs a process for deleting a membership registration at the request of an applicant. The membership card database 3315 is used for archiving the public keys and other information of members who are entitled to membership.

The terminal 3330 of the member A comprises an information exchange module 3331 and an IC card input/output module 3332. The information exchange module 3331 performs various data transfer processes with other terminals through the network. The IC card input/output module 3332 inputs and outputs various information to and from IC cards issued by the individual certification authority and the membership certification authority. The terminal 3340 of the member B comprises an information exchange module 3341 and an IC card input/output module 3342. These modules are similar to those provided in the terminal 3330 of the member A.

FIG. 18 shows an internal structure of the membership card database 3315. The membership card database 3315 stores, on a member basis, membership card number, the name of a member, individual certifying document number, valid period, member's public key and secondary information. The valid period includes the starting date and time and the ending date and time. The public key of a member includes an algorithm of the key and a bit string of the key. Although not shown in the drawing, the individual certifying document database 3325 provided in the terminal 3320 of the individual certification authority has a similar structure and stores, on an individual basis, the name of an individual, individual certifying document number, valid period, individual's public key and secondary information.

Figure 19:
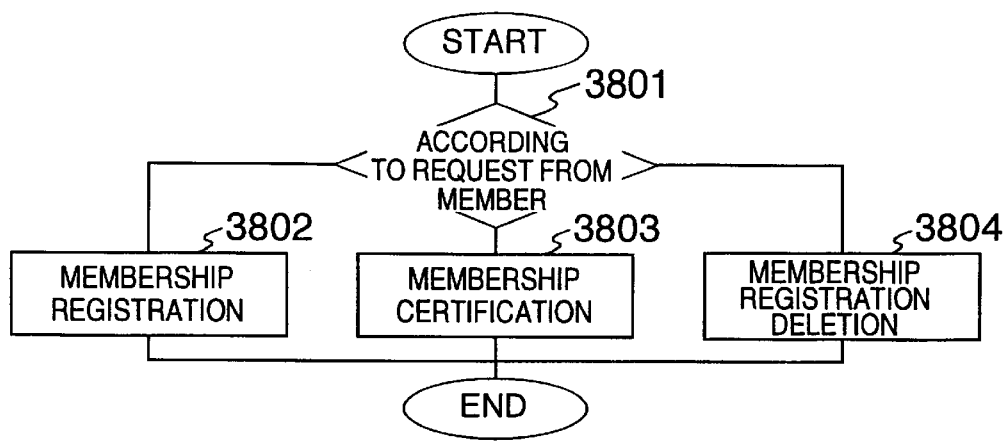
FIG. 19 is a flowchart showing a procedure performed by a control module at a terminal of a membership certification authority in the embodiment shown in FIG. 17.

FIG. 19 is a flowchart showing a procedure performed by the control module 3311 in the terminal 3310 of the membership certification authority. First, in Step 3801, a request made by a member (a request transmitted from the terminal 3330 or 3340 of a member through the network) is determined, and is branched in accordance with the type of request. If the request is for membership registration, the membership registration module 3312 performs the membership registration process in Step 3802. If the request is for membership certification, the membership certification module 3313 performs the membership certification process in Step 3803. If the request is for membership registration deletion, the membership registration deletion module 3314 performs the membership registration deletion process in Step 3804.

Figure 20:
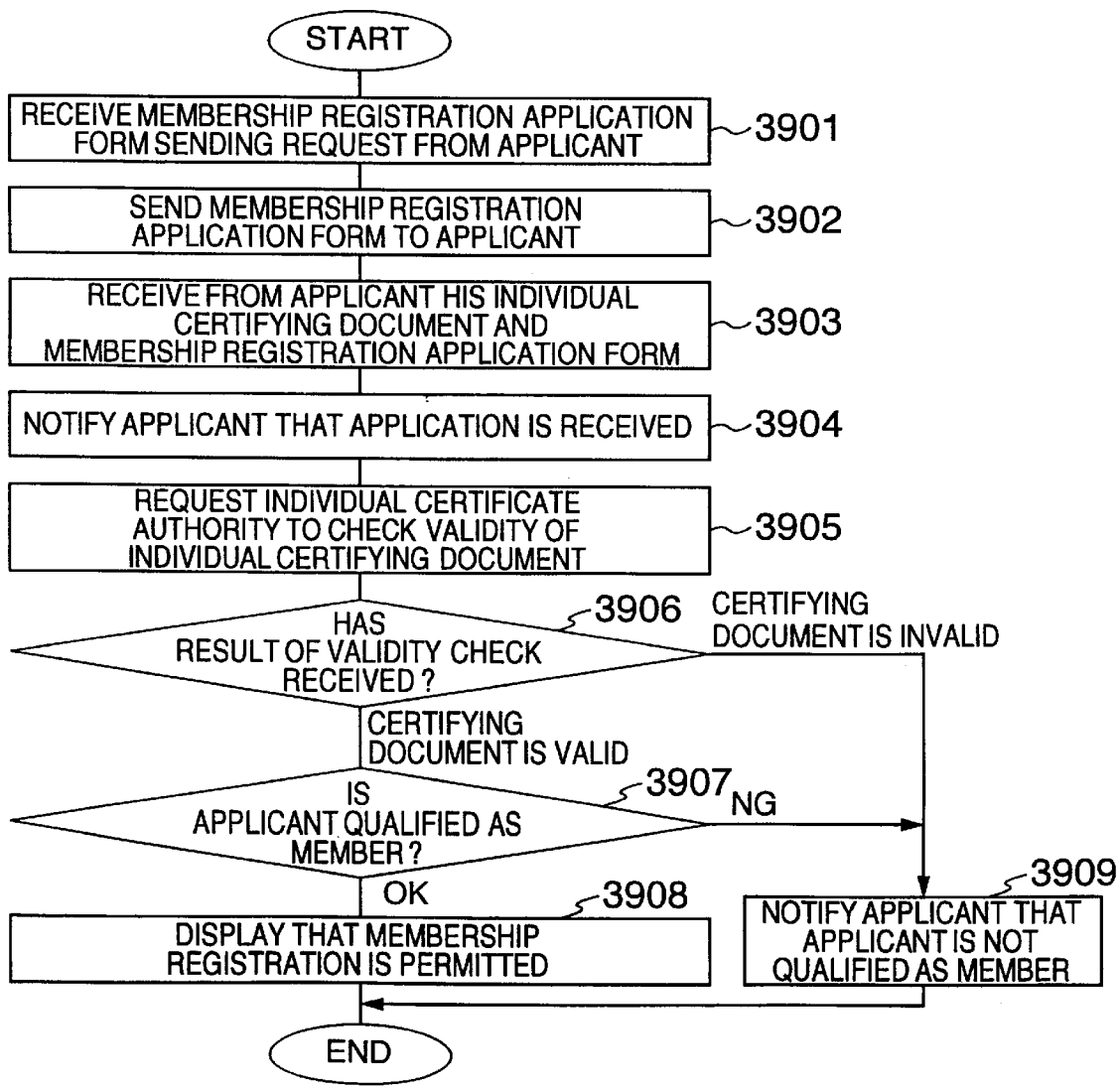
FIG. 20 is a flowchart showing a procedure (part 1) performed by a membership registration module at the terminal of the membership certification authority in the embodiment shown in FIG. 17.

FIG. 20 is a flowchart showing the procedure performed by the membership registration module 3312 in Step 3802. This flowchart shows a process performed by the terminal 3310 of the membership certification authority from the reception of an applicant's request for sending a membership registration application form to the notifying of the result of a qualification test for membership to the applicant from the membership certification authority. First, in Step 3901, the membership certification authority receives a request for sending a membership registration application form transmitted from the terminal 3330 or 3340 of an applicant, and transmits the membership registration application form to the terminal of the applicant in Step 3902. The membership registration application form is an electronic document of a predetermined form. Since the applicant writes various items in the membership registration application form and thereafter transmits the written membership registration application form and his own individual certifying document to the terminal 3310 of the membership certification authority, the membership certification authority receives these documents in Step 3903. Upon reception of the membership registration application form and the individual certifying document, the membership certification authority notifies the terminal of the applicant that the application is received in Step 3904.

Then, the terminal 3310 of the membership certification authority requests the terminal 3320 of the individual certification authority to check the validity of the individual certifying document of the applicant in Step 3905. The terminal 3320 of the individual certification authority checks the validity of the applicant's individual certifying document based on the request and transmits the result to the terminal 3310 of the membership certification authority. The terminal 3310 of the membership certification authority receives the result and determines whether the individual certifying document is valid or invalid in Step 3306. If the certificate is found out to be invalid, the membership certification authority notifies the applicant's terminal to the effect that the applicant is not entitled to membership and ends the process in Step 3909. If the document is found out to be valid, the membership certification authority test the qualifications for membership in Step 3907. If it is found out that the applicant is qualified as a member, the membership certification authority gives permission for membership registration and ends the process in Step 3908. If it is found out that the applicant is not qualified as a member, Step 3909 is performed.

If permission for membership registration is given by the process shown in FIG. 20, an IC card with built-in key generation software is mailed to the applicant. The applicant prepares a membership card in the IC card, and sends the prepared IC card together with his individual certifying document to the terminal 3310 of the membership certification authority.

Figure 21:
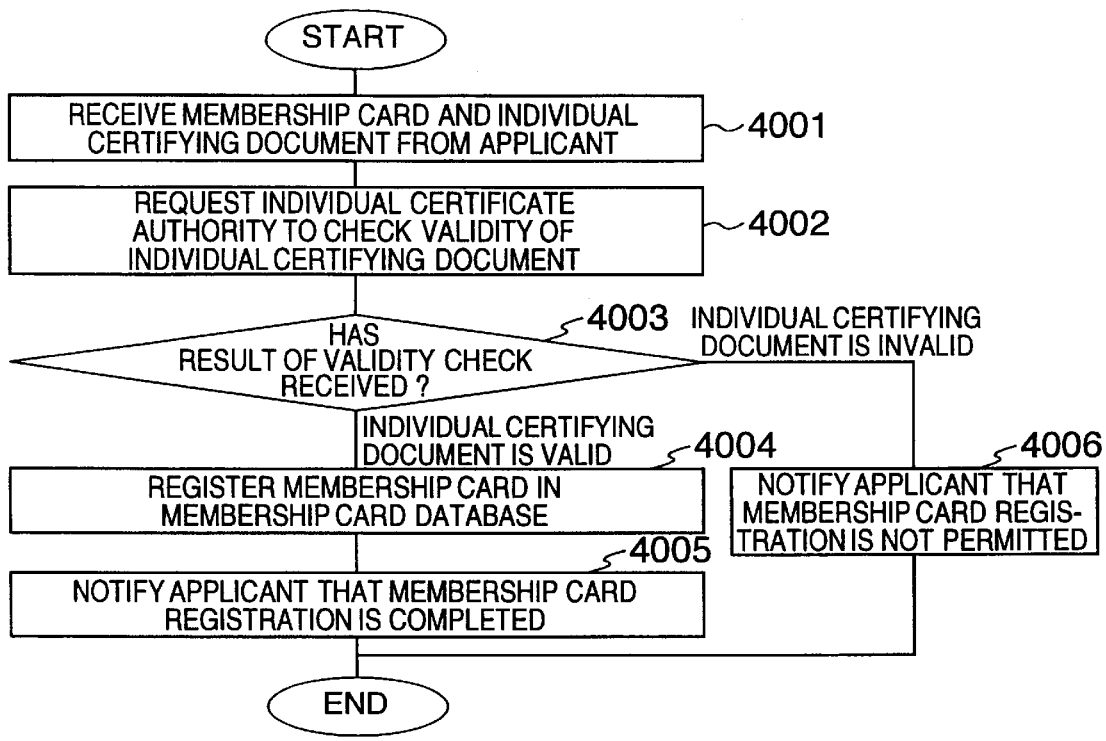
FIG. 21 is a flowchart showing a procedure (part 2) performed by a membership registration module at the terminal of the membership certification authority in the embodiment shown in FIG. 17.

FIG. 21 is a flowchart showing the procedure performed by the terminal 3310 of the membership certification authority from the reception of the membership card and individual certifying document sent from an applicant to the notifying of the completion of membership registration. First, in Step 4001, the membership certification authority receives the membership card and individual certifying document sent from the terminal (3330 or 3340) of an applicant. Then, in Step 4002, the membership certification authority requests the terminal 3320 of the individual certification authority to check the validity of the individual certifying document. Since the terminal 3320 of the individual certification authority checks the validity of that individual certifying document and transmits the result to the terminal 3310 of the membership certification authority, the terminal 3310 of the membership certification authority receives that result and determines whether the individual certifying document is valid or not in Step 4003. If the individual certifying document is found out to be valid, the membership certification authority registers various information of the applicant in the membership card database 3315 in Step 4004, and ends the process after notifying the applicant that the membership registration is complete in Step 4005. The notification about he completion of the membership registration includes the membership card that includes a certificate certifying that the public key of the applicant entitled to membership is truly possessed by the applicant himself (specifically, the certificate is prepared by enciphering predetermined information including the public key using the private key of the membership certification authority). If the individual certifying document is found out to be invalid in Step 4003, the membership certification authority notifies the applicant that a membership registration cannot be made for the applicant and ends the process in Step 4006.

Until the applicant receives the notification of membership registration from the membership certification authority 3310 after the applicant has sent the membership registration application form, the membership certification authority 3310 requests the individual certification authority 3320 to check the validity of the individual certifying document twice as shown in Steps 3905 and 4002 of FIGS. 20 and 21. However, such request may be made only once.

Figure 22:
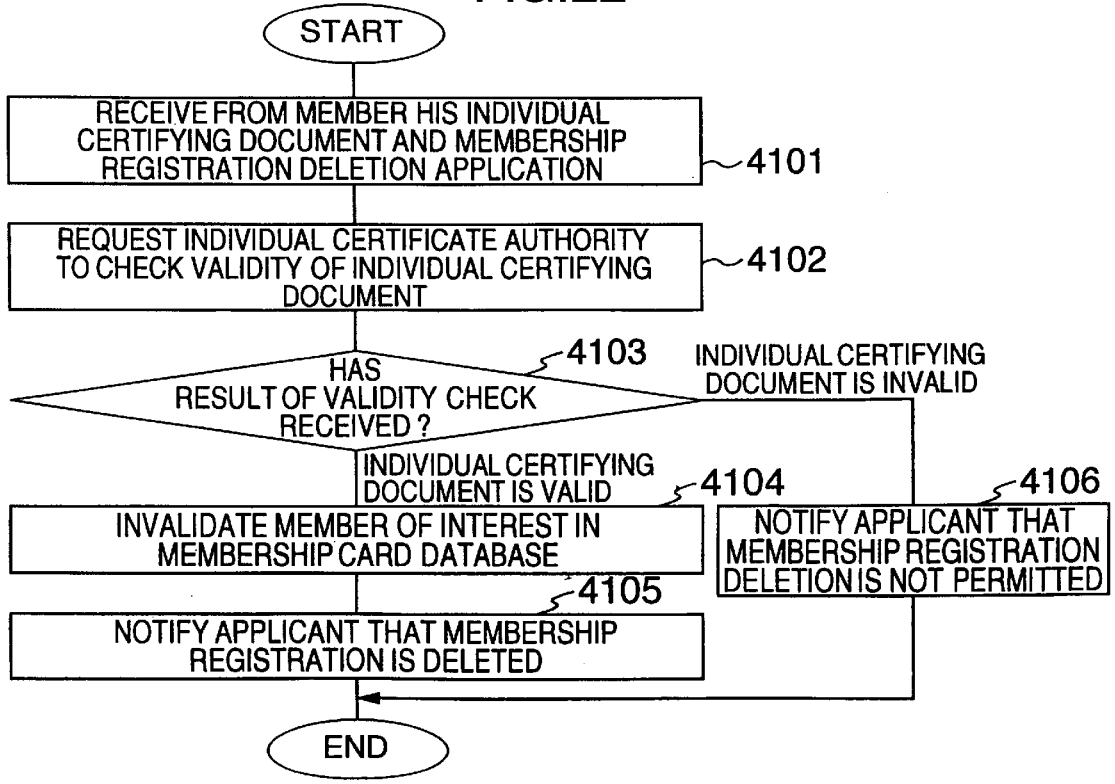
FIG. 22 is a flowchart showing a procedure performed by a membership registration deletion module at the terminal of the membership certification authority in the embodiment shown in FIG. 17.

FIG. 22 is a flowchart showing the procedure performed by the membership registration deletion module 3314 shown by Step 3804 in FIG. 19. This flowchart shows a process performed by the terminal 3310 of the membership certification authority. First, in Step 4101, the membership certification authority receives the membership card, individual certifying document and membership registration deletion application transmitted from the terminal (3330 or 3340) of a member himself. Then, in Step 4102, the membership certification authority requests the individual certification authority 3320 to check the validity of the individual certifying document. Since the terminal 3320 of the individual certification authority checks the validity of that individual certifying document and transmits the result, the membership certification authority 3310 receives that result and determines whether the individual certifying document is valid or not in Step 4103. If the individual certifying document is found out to be valid, the membership certification authority first checks the validity of the membership card and then invalidates the information about the member in the membership card database 3315 in Step 4104. Further, in Step 4105, the membership certification authority notifies the applicant that his membership registration has been deleted and ends the process. If the individual certifying document is found out to be invalid in Step 4103, the membership certification authority notifies the applicant that the membership registration cannot be deleted for the applicant and ends the process in Step 4106.

Figure 23:
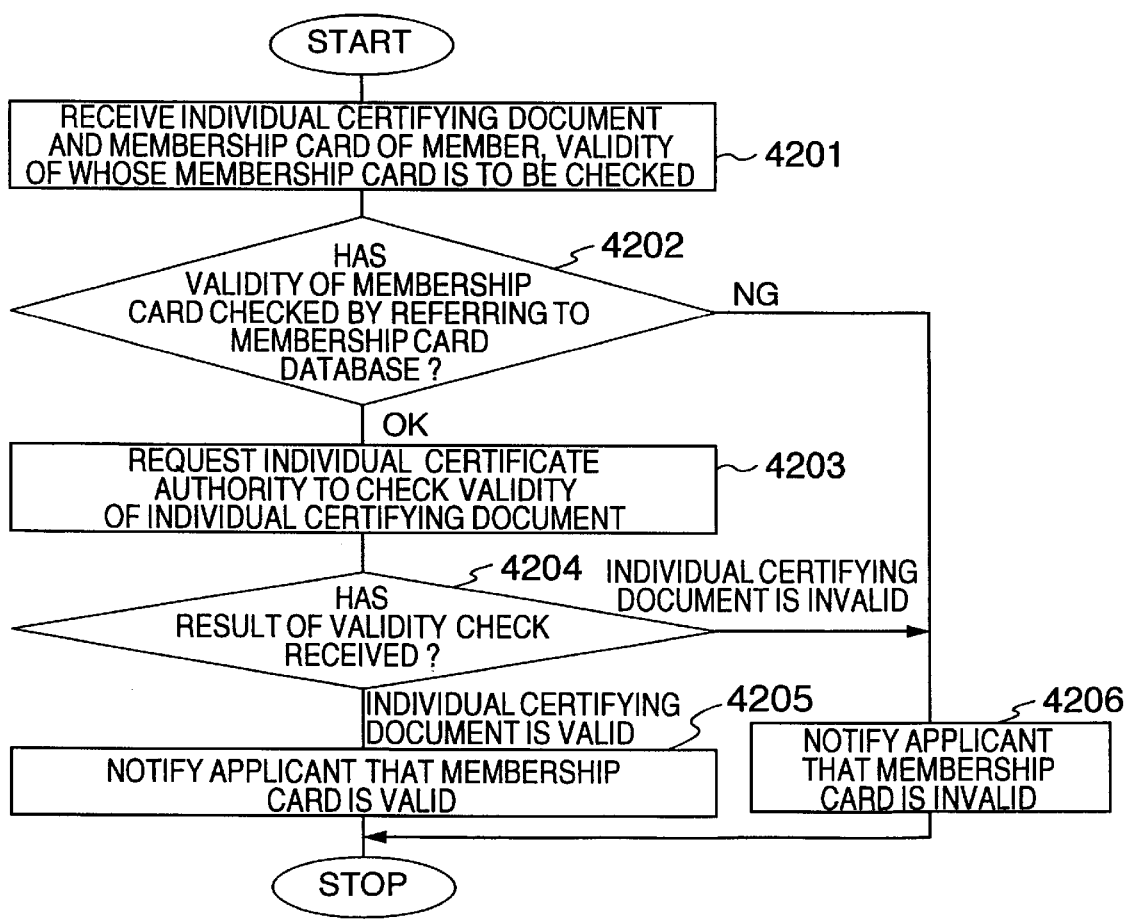
FIG. 23 is a flowchart showing a procedure performed by a membership certification module at the terminal of the membership certification authority in the embodiment shown in FIG. 17.

FIG. 23 is a flowchart showing the procedure performed by the membership certification module 3313 shown by Step 3803 in FIG. 19. This flowchart shows a process performed by the terminal 3310 of the membership certification authority. First, in Step 4201, the membership certification authority receives the individual certifying document and membership card of an individual which are transmitted from the terminal of a member who wishes to check the validity of such documents. Then, in Step 4202, the membership certification authority refers to the membership card database 3315 and checks the validity of the membership card in question. If the membership card is found out to be valid, the membership certification authority requests the individual certification authority 3320 to check the validity of that individual certifying document in Step 4203. Since the terminal 3320 of the individual certification authority checks the validity of the individual certifying document in response to such request and transmits the result, the terminal 3310 of the membership certification authority receives the result and determines whether the individual certifying document is valid or not in Step 4204. If the individual certifying document is found out to be valid, the membership certification authority notifies the applicant that the membership card is valid and ends the process in Step 4205. If the individual certifying document is found out to be invalid in Step 4204, the membership certification authority notifies the applicant that the membership card is invalid and ends the process in Step 4206.

According to the aforementioned embodiment shown in FIG. 17, the membership certification authority can identify an individual non-face-to-face by having the individual certification authority checked the validity of the individual certifying document during the membership registration process. It is assumed that a public entity will take care of individual certification that is equivalent to resident registration and check the identity of each individual face-to-face. On the other hand, when various types of organizations make membership registrations, identity of an individual can be checked by merely making an inquiry into the individual certification authority, and thus membership registrations can be made non-face-to-face, which in turn reduces the burden of cumbersome membership registration process. At the time of a membership registration, an organization can check the identity of an individual without referring to the individual's private information that would be archived by the public entity. That is, by sending only the information necessary to test the qualifications for membership from the individual certification authority to the membership certification authority, identity check of the individual concerned can be made without infringing on his privacy. Further, when the members A and B make business transactions, the validity of both their membership cards and individual certifying documents is checked. Therefore, the authenticity of the other party whom the applicant intends to start business with can be checked with high accuracy. Further, members often hold their membership certifying document and individual certifying document in separate IC cards. When a member has lost either one of his IC cards, the member should notify the membership certification authority or the individual certification authority of the loss so that the lost IC card will less likely be used improperly.

Then, another embodiment of the present invention will be described. In the case where an individual requests a predetermined certificate authority to issue a certificate by registering his public key in the ways described in the aforementioned embodiments, one may consider it beneficial to request the certificate authority to make a registration of the public keys of a plurality of persons collectively in order to reduce the time and labor involved in the registration. An exemplary case is that a responsible person in a corporation requests the certificate authority to make a registration of the public keys of a plurality of employees of the corporation collectively. In this case, there is a danger that the responsible person will illegally modify the employees' public keys to be registered or that illegal modifications will accidentally be made to such public keys.

This embodiment is designed to make registrations in the following procedure in order to prevent illegal action to be taken by a responsible person who requests the certificate authority to make a collective registration for the public keys of a plurality of applicants. The following describes an example in which a person B responsible for registration requests a certification authority (certificate authority) C to make a collective registration for an applicant A who applies for the registration of his public key in a corporation D. First, the applicant A enciphers his public key (for which he applies registration) using the public key of the certification authority C, and delivers his enciphered public key to the responsible person B. The responsible person B puts his electronic signature on the public key of the applicant A which is to be registered, and sends such public key to the certification authority C. The certification authority C retrieves the public key of the applicant A using its private key after checking that the public key has not been altered through the electronic signature put by the responsible person B, and prepares a certificate of the applicant A. Then, the certification authority C enciphers the prepared certificate using the public key of the corporation D, and thereafter sends the enciphered certificate back to the responsible person B or the applicant A. In the case where the certificate is sent to the responsible person B, the certification authority C may encipher the certificate using the public key of the applicant A in addition to the public key of the corporation D since there is no guarantee that the certificate will be delivered to the applicant A without fail.

FIG. 24 is a flowchart showing the public key registration process in this embodiment. Steps 4301 to 4204 indicate process steps to be taken by the applicant A; Steps 4305, 4306, 4313 and 4314 indicate process steps to be taken by the responsible person B; and Steps 4307 to 4312 indicate process steps to be taken by the certification authority C.

First, the applicant A who applies for a collective registration generates his public key in Step 4310, and obtains the public key of the certification authority C in Step 4302. Then, in Step 4303, the applicant A enciphers his public key using the public key of the certification authority C and delivers the enciphered public key to the responsible person B to apply for the registration of his enciphered public key. Although not shown in the drawing, other applicants apply for registration by similarly delivering their enciphered public keys to the responsible person B. Since the process steps for the other applicants are similar, the following describes the process steps with reference to only the applicant A.

The responsible person B prepares a certificate issuance request form by synthesizing the enciphered public key of the applicant A whose application has been received and other necessary information, and puts his electronic signature to the certificate issuance request form using his private key in Step 4305, and thereafter sends the signed certificate issuance request form to the certification authority C in Step 4306.

The certification authority C checks the signature on the electronically signed certificate issuance request form sent from the responsible person B and determines that the certificate issuance request form is truly sent from the responsible person B and is unaltered in Step 4307. If it is determined that the request form is sent from the responsible person B and is unaltered, the certification authority C, using its private key, deciphers the enciphered public key of the applicant A included in the certificate issuance request form in Step 4309. Then, in Step 4310, the authority C prepares a certificate of the public key of the applicant A. Then, the certification authority C enciphers the certificate using the public key of the corporation D in Step 4311, issues the certificate in Step 4312, and goes on to Step 4313. If it is determined that the certificate issuance request form is not sent from the responsible person B or is altered in Step 4307, the authority C notifies the responsible person B of that effect and destroys the enciphered applicant's public key that has been altered in Step 4308. It may be noted that, in the flowchart shown in FIG. 24, only the enciphered public key that has been altered is destroyed in Step 4308 and the other enciphered public keys that are deemed authentic are subjected to Step 4309 and onwards. However, the certification authority C may end the process upon determination in Step 4308 that any one public key of an applicant has been altered.

The responsible person B receives the certificate sent from the certification authority C in Step 4313, obtains the certificate of the public key of the applicant A by deciphering the certificate using the private key of the corporation D, and delivers the certificate to the applicant A in Step 4314.

According to the embodiment shown in FIG. 24, illegal action, either accidental or intentional, to be taken on unregistered public keys can be prevented when the person B responsible for registration makes a collective registration of public keys in the corporation D, and it can be ensured that such collective registration is truly requested by the responsible person B (the corporation D), and the certificate can be sent to the corporation D from the certification authority C. Further, when the corporation D makes a collective public key registration, the corporation D may designate the person B as the final responsible person for making a request to the certification authority C after causing various personnel and departments such as managers, the personnel department and the general affairs department to examine applicants for public key registration. The embodiment shown in FIG. 24 can prevent any accidental or intentional illegal action possibly taken during the examination process as well. If the certification authority C sends the certificate by enciphering the certificate using the public key of the applicant A in addition to the public key of the corporation D, the certificate can be delivered to the applicant A safely as ell as reliably.

What is claimed is:

1. An electronic certification method to be applied to a system in which a service supplying unit is capable of being coupled to a plurality of service receiving units to one another through a communication network, the service supplying unit being used by a service supplier who supplies an authentication service, each of the service receiving units being used by a service receiver who receives the authentication service, the method comprising the steps of:

transmitting contract information from the service supplying unit to the service receiving units of the service receivers who are contracting parties, respectively, the contract information including a content of a contract;

causing each of the service receiving units having received the contract information to prepare one party-signed contract information by causing each service receiver to electronically sign the contract information and to transmit the one party-signed contract information to the service supplying unit;

causing the service supplying unit to receive the one party-signed contract information transmitted from each of the service receiving units, to synthesize a plurality of received copies of one party-signed contract information into a single document, and then to prepare contract information signed by the service supplier by causing the service supplier to electrically sign the document;

causing the service supplying unit to store the prepared service supplier-signed contract information; and transmitting the service supplier-signed contract information from the service supplying unit to each of the service receiving units.

2. An electronic certification method to be applied to a system in which a terminal of a service supplying unit, terminals of a plurality of service receiving units and a terminal of a certificate authority are capable of being coupled to one another through a communication network, the service supplying unit being used by a service supplier who supplies an authentication service, each of the service receiving units being used by a service receiver who receives the authentication service, the certificate authority issuing a certificate for ensuring that a public key of the service supplier or a public key of each of the service receivers is truly possessed by the service supplier or the service receiver himself, the method comprising the steps of:

causing the service supplying unit to generate a public key and a private key of the service supplier;

causing each of the service receiving units to generate a public key and a private key of the corresponding service receiver;

transmitting the generated public keys and private keys from the service supplying unit and each of the service receiving units to the terminal of the certificate authority;

causing the terminal of the certificate authority to generate certificates corresponding to the received public keys one by one and to transmit the generated certificates to the service supplier and each of the service receiving units, respectively;

causing the service supplying unit and each of the service receiving units to receive the certificates, respectively;

causing each of the service receiving units to transmit contract-related information including a content of a contract to the service supplying unit;

causing the service supplying unit to prepare contract information including the content of the contract by synthesizing copies of the contract-related information respectively transmitted from the service receiving units and to transmit the prepared contract information to each of the service receiving units;

causing each of the service receiving units to prepare data obtained by linking appended information including the certificate of the corresponding service receiver with the received contract information in a predetermined order, to generate a hashed element by compressing the linked data using a predetermined unidirectional function, to generate an electronic signature by enciphering the hashed element using a private key of the service receiver, to generate one party-signed contract information by synthesizing the enciphered electronic signature with the linked data, and to transmit the one party-signed contract information to the service supplying unit;

causing the service supplying unit to receive the one party-signed contract information transmitted from each of the service receiving units, to retrieve the appended information and signature added by each service receiver from each of the plurality of received copies of one party-signed contract information, to prepare data obtained by linking the retrieved information with appended information including the certificate of the service supplier in a predetermined order, to generate a hashed element by compressing the linked data using a predetermined unidirectional function, to generate an electronic signature by enciphering the hashed element using the private key of the service supplier, and to prepare service supplier-signed contract information by synthesizing the enciphered electronic signature with the linked data;

causing the service supplying unit to store the prepared service supplier-signed contract information; and transmitting the service supplier-signed contract information from the service supplying unit to each of the service receiving units.

3. An electronic certification method according to claim 2, wherein communication among the service supplying unit, the service receiving units and the certificate authority unit through the network is carried out by means of cryptographic communication in which: a common key is shared using a public key of the certificate authority unit, and a public key enciphering algorithm; and the shared common key and a common key enciphering algorithm are used.

4. An electronic certification method according to claim 1, wherein communication between the service supplying unit and the service receiving units through the network is carried out by means of cryptographic communication in which: a certificate of the service supplying unit is exchanged with certificates of the service receiving units; a common key is shared using the public key of the service supplying unit and a public key enciphering algorithm; and the shared common key and a common key enciphering algorithm are used.

5. An electronic certification method according to claim 2, wherein communication between the service supplying unit and the service receiving units through the network is carried out by means of cryptographic communication in which: the certificate of the service supplying unit is exchanged with the certificates of the service receiving units; a common key is shared using the public key of the service supplying unit and a public key enciphering algorithm; and the shared common key and a common key enciphering algorithm are used.

6. An electronic certification method according to claim 1, wherein a storage medium is given to each of the service supplier and the service receivers in advance, the storage medium storing a certificate authority certificate, which is a public key of the certificate authority, and being capable of releasably inserted into the service supplying unit or the service receiving unit; and the public keys and private keys of the service supplier and each of the service receivers and certificates issued by the certificate authority are stored in the storage medium.

7. An electronic certification method according to claim 2, wherein a storage medium is given to each of the service supplier and the service receivers in advance, the storage medium storing a certificate authority certificate, which is a public key of the certificate authority, and being capable of releasably inserted into the service supplying unit or the service receiving unit; and the public keys and private keys of the service supplier and each of the service receivers and the certificates issued by the certificate authority are stored in the storage medium.

8. An electronic certification method according to claim 6, wherein the releasably attached storage medium is an IC card having a cryptographic key generating program for generating a public key and a private key, a digital signature generating program for generating an electronic signature by enciphering entered data using the private key and outputting the generated signature, and a processing unit for executing the programs to perform cryptographic key generation and signature generation; and the service supplier and each of the service receivers generate private keys, public keys and electronic signatures, and store the generated private keys and public keys and the certificates sent from the certificate authority in the IC cards using the IC cards.

9. An electronic certification method according to claim 7, wherein the releasably attached storage medium is an IC card having a cryptographic key generating program for generating a public key and a private key, a digital signature generating program for generating an electronic signature by enciphering entered data using the private key and outputting the generated signature, and a processing unit for executing the programs to perform cryptographic key generation and signature generation; and the service supplier and each of the service receivers generate private keys, public keys and electronic signatures, and store the generated private keys and public keys and the certificates sent from the certificate authority in the IC cards using the IC cards.

10. An electronic certification method according to claim 6, wherein the releasably attached storage medium stores an enciphered private key, an enciphered public key, an enciphered self-certificate, and password check data, the enciphered keys and certificate being enciphered using a password of an authentic user of the storage medium, the password check data being used to check the password; and when a user accesses the enciphered private key, the enciphered public key and the enciphered self-certificate, a password entered by the user is checked using the password check data, and access is permitted only when the user is found out to be an authentic user.

11. An electronic certification method according to claim 7, wherein the releasably attached storage medium stores an enciphered private key, an enciphered public key, an enciphered self-certificate, and password check data, the enciphered keys and certificate being enciphered using a password of an authentic user of the storage medium, the password check data being used to check the password; and when a user accesses the enciphered private key, the enciphered public key and the enciphered self-certificate, a password entered by the user is checked using the password check data, and access is permitted only when the user is found out to be an authentic user.

12. An electronic certification method according to claim 6, wherein the releasably attached storage medium is an IC card having a built-in clock, a cryptographic key generating program for generating a public key and a private key, a digital signature generating program for generating an electronic signature by enciphering entered data using the private key and outputting the generated signature, and a processing unit for executing the programs to perform cryptographic key generation and signature generation; and the service supplier and each of the service receivers generate private keys, public keys and electronic signatures, store the generated private keys and public keys and the certificates sent from the certificate authority in the IC cards using the IC cards, and each of the signatures is generated by enciphering data obtained by adding date and time indicated by the built-in clock to data to be signed using the private key at the time of signature generation.

13. An electronic certification method according to claim 7, wherein the releasably attached storage medium is an IC card having a built-in clock, a cryptographic key generating program for generating a public key and a private key, a digital signature generating program for generating an electronic signature by enciphering entered data using a private key and outputting the generated signature, and a processing unit for executing the programs to perform cryptographic key generation and signature generation; and the service supplier and each of the service receivers generate private keys, public keys and electronic signatures, store the generated private keys and public keys and the certificates sent from the certificate authority in the IC cards using the IC cards, and each of the signatures is generated by enciphering data obtained by adding date and time indicated by the built-in clock to data to be signed using the private key at the time of signature generation.

14. An electronic certification method according to claim 12, wherein the IC card receives standard time data indicating a correct time transmitted by a time management authority immediately before generating an electronic signature, and adjusts the built-in clock based on the standard time data.

15. An electronic certification method according to claim 13, wherein the IC card receives standard time data indicating a correct time transmitted by a time management authority immediately before generating an electronic signature, and adjusts the built-in clock based on the standard time data.

16. An electronic certification method according to claim 14, wherein the IC card comprises a radio receiver, and adjusts the built-in clock based on the standard time data transmitted from the time management authority and received by the radio receiver.

17. An electronic certification and authentication method according to claim 15, wherein the IC card comprises a radio receiver, and adjusts the built-in clock based on the standard time data transmitted from the time management authority and received by the radio wave receiving unit.

18. An electronic certification method according to claim 6, wherein a signature record is stored in the releasably attached storage medium when an authentic user of the storage medium puts an electronic signature using a private key, a public key and a certificate stored in the storage medium, and when the private key, the public key and the certificate in the storage medium are altered to new data, the previously used private key, public key and certificate are stored in a different area, if necessary, by referring to the signature record.

19. An electronic certification method according to claim 7, wherein a signature record is stored in the releasably attached storage medium when an authentic user of the storage medium puts an electronic signature using a private key, a public key and a certificate stored in the storage medium, and when the private key, the public key and the certificate in the storage medium are altered to new data, the previously used private key, public key and certificate are stored in a different area, if necessary, by referring to the signature record.

20. An electronic certification system in which a service supplying unit is capable of being coupled to a plurality of service receiving units to one another through a communication network, the service supplying unit being used by a service supplier who supplies an authentication service, each of the service receiving units being used by a service receiver who receives the authentication service, the system:
transmitting contract information from the service supplying unit to the service receiving units of the service receivers who are contracting parties, respectively, the contract information including a content of a contract;
causing each of the service receiving units having received the contract information to prepare one party-signed contract information by causing each service receiver to electronically sign the contract information and to transmit the one party-signed contract information to the service supplying unit;
causing the service supplying unit to receive the one party-signed contract information transmitted from each of the service receiving units, to synthesize a plurality of received copies of one party-signed contract information into a single document, and then to prepare contract information signed by the service supplier by causing the service supplier to electrically sign the document, causing the service supplying unit to store the prepared service supplier-signed contract information, and transmitting the service supplier-signed contract information from the service supplying unit to each of the service receiving units.

21. An electronic certification system in which a terminal of a service supplying unit, terminals of a plurality of service receiving units and a terminal of a certificate authority are capable of being coupled to one another through a communication network, the service supplying unit being used by a service supplier who supplies an authentication service, each of the service receiving units being used by a service receiver who receives the authentication service, the certificate authority issuing a certificate for ensuring that a public key of the service supplier or a public key of each of the service receivers is truly possessed by the service supplier or the service receiver himself, the system:
causing the service supplying unit to generate a public key and a private key of the service supplier;
causing each of the service receiving units to generate a public key and a private key of the corresponding service receiver;
transmitting the generated public keys and private keys from the service supplying unit and each of the service receiving units to the terminal of the certificate authority;
causing the terminal of the certificate authority to generate certificates corresponding to the received public keys one by one and to transmit the generated certificates to the service supplier and each of the service receiving units, respectively;
causing the service supplying unit and each of the service receiving units to receive the certificates, respectively;
causing each of the service receiving units to transmit contract-related information including a content of a contract to the service supplying unit;
causing the service supplying unit to prepare contract information including the content of the contract by synthesizing copies of the contract-related information respectively transmitted from the service receiving units and to transmit the prepared contract information to each of the service receiving units;

causing each of the service receiving units to prepare data obtained by linking appended information including the certificate of the corresponding service receiver with the received contract information in a predetermined order, to generate a hashed element by compressing the linked data using a predetermined unidirectional function, to generate an electronic signature by enciphering the hashed element using a private key of the service receiver, to generate one party-signed contract information by synthesizing the enciphered electronic signature with the linked data, and to transmit the one party-signed contract information to the service supplying unit;

causing the service supplying unit to receive the one party-signed contract information transmitted from each of the service receiving units, to retrieve the appended information and signature added by each service receiver from each of the plurality of received copies of one party-signed contract information, to prepare data obtained by linking the retrieved information with appended information including the certificate of the service supplier in a predetermined order, to generate a hashed element by compressing the linked data using a predetermined unidirectional function, to generate an electronic signature by enciphering the hashed element using the private key of the service supplier, and to prepare service supplier-signed contract information by synthesizing the enciphered electronic signature with the linked data;

causing the service supplying unit to store the prepared service supplier-signed contract information; and transmitting the service supplier-signed contract information from the service supplying unit to each of the service receiving units.

22. An electronic certification system according to claim 21, wherein communication among the service supplying unit, the service receiving units and the certificate authority unit through the network is carried out by means of cryptographic communication in which: a common key is shared using a public key of the certificate authority unit and a public key enciphering algorithm; and the shared common key and the common key enciphering algorithm are used.

23. An electronic certification system according to claim 20, wherein communication between the service supplying unit and the service receiving units through the network is carried out by means of cryptographic communication in which: a certificate of the service supplying unit is exchanged with certificates of the service receiving units; a common key is shared using the public key of the service supplying unit and a public key enciphering algorithm; and the shared common key and a common key enciphering algorithm are used.

24. An electronic certification system according to claim 21, wherein communication between the service supplying unit and the service receiving units through the network is carried out by means of cryptographic communication in which: the certificate of the service supplying unit is exchange with the certificates of the service receiving units; a common key is shared using the public key of the service supplying unit and a public key enciphering algorithm; and the shared common key and a common key enciphering algorithm are used.

25. An electronic certification system according to claim 20, wherein a storage medium is given to each of the service supplier and the service receivers in advance, the storage medium storing a certificate authority certificate, which is a public key of the certificate authority, and being capable of releasably inserted into the service supplying unit or the service receiving unit; and the public keys and private keys of the service supplier and each of the service receivers and certificates issued by the certificate authority are stored in the storage medium.

26. An electronic certification system according to claim 21, wherein a storage medium is given to each of the service supplier and the service receivers in advance, the storage medium storing a certificate authority certificate, which is a public key of the certificate authority, and being capable of releasably inserted into the service supplying unit or the service receiving unit; and the public keys and private keys of the service supplier and each of the service receivers and the certificates issued by the certificate authority are stored in the storage medium.

27. An electronic certification system according to claim 25, wherein the releasably attached storage medium is an IC card having a cryptographic key generating program for generating a public key and a private key, a digital signature generating program for generating an electronic signature by enciphering entered data using the private key and outputting the generated signature, and a processing unit for executing the programs to perform cryptographic key generation and signature generation; and the service supplier and each of the service receivers generate private keys, public keys and electronic signatures, and store the generated private keys and public keys and the certificates sent from the certificate authority in the IC cards using the IC cards.

28. An electronic certification system according to claim 26, wherein the releasably attached storage medium is an IC card having a cryptographic key generating program for generating a public key and a private key, a digital signature generating program for generating an electronic signature by enciphering entered data using the private key and outputting the generated signature, and a processing unit for executing the programs to perform cryptographic key generation and signature generation; and the service supplier and each of the service receivers generate private keys, public keys and electronic signatures, and store the generated private keys and public keys and the certificates sent from the certificate authority in the IC cards using the IC cards.

29. An electronic certification system according to claim 25, wherein the releasably attached storage medium stores an enciphered private key, an enciphered public key, an enciphered self-certificate, and password check data, the enciphered keys and certificate being enciphered using a password of an authentic user of the storage medium, the password check data being used to check the password; and when a user accesses the enciphered private key, the enciphered public key and the enciphered self-certificate, a password entered by the user is checked using the password check data, and access is permitted only when the user is found out to be an authentic user.

30. An electronic certification system according to claim 26, wherein the releasably attached storage medium stores an enciphered private key, an enciphered public key, an enciphered self-certificate, and password check data, the enciphered keys and certificate being enciphered using a password of an authentic user of the storage medium, the password check data being used to check the password; and when a user accesses the enciphered private key, the enciphered public key and the enciphered self-certificate, a password entered by the user is checked using the password check data, and access is permitted only when the user is found out to be an authentic user.

31. An electronic certification system according to claim 25, wherein the releasably attached storage medium is an IC card having a built-in clock, a cryptographic key generating program for generating a public key and a private key, a digital signature generating program for generating an electronic signature by enciphering entered data using the private key and outputting the generated signature, and a processing unit for executing the programs to perform cryptographic key generation and signature generation; and the service supplier and each of the service receivers generate private keys, public keys and electronic signatures, store the generated private keys and public keys and the certificates sent from the certificate authority in the IC cards using the IC cards, and each of the signatures is generated by enciphering data obtained by adding date and time indicated by the built-in clock to data to be signed using the private key at the time of signature generation.

32. An electronic certification system according to claim 26, wherein the releasably attached storage medium is an IC card having a built-in clock, a cryptographic key generating program for generating a public key and a private key, a digital signature generating program for generating an electronic signature by enciphering entered data using a private key and outputting the generated signature, and a processing unit for executing the programs to perform cryptographic key generation and signature generation; and the service supplier and each of the service receivers generate private keys, public keys and electronic signatures, store the generated private keys and public keys and the certificates sent from the certificate authority in the IC cards using the IC cards, and each of the signatures is generated by enciphering data obtained by adding date and time indicated by the built-in clock to data to be signed using the private key at the time of signature generation.

33. An electronic certification system according to claim 31, wherein the IC card receives standard time data indicating a correct time transmitted by a time management authority immediately before generating an electronic signature, and adjusts the built-in clock based on the standard time data.

34. An electronic certification system according to claim 32, wherein the IC card receives standard time data indicating a correct time transmitted by a time management authority immediately before generating an electronic signature, and adjusts the built-in clock based on the standard time data.

35. An electronic certification system according to claim 33, wherein the IC card comprises a radio receiver, and adjusts the built-in clock based on the standard time data transmitted from the time management authority and received by the radio receiver.

36. An electronic certification system according to claim 34, wherein the IC card comprises a radio receiver, and adjusts the built-in clock based on the standard time data transmitted from the time management authority and received by the radio wave receiving unit.

37. An electronic certification system according to claim 25, wherein a signature record is stored in the releasably attached storage medium when an authentic user of the storage medium puts an electronic signature using a private key, a public key and a certificate stored in the storage medium, and when the private key, the public key and the certificate in the storage medium are altered to new data, the previously used private key, public key and certificate are stored in a different area, if necessary, by referring to the signature record.

38. An electronic certification system according to claim 26, wherein a signature record is stored in the releasably attached storage medium when an authentic user of the storage medium puts an electronic signature is put using a private key, a public key and a certificate stored in the storage medium, and when the private key, the public key and the certificate in the storage medium are altered to new data, the previously used private key, public key and certificate are stored in a different area, if necessary, by referring to the signature record.

39. An electronic certification method according to claim 1, the method further comprising the steps of:

causing the service supplying unit to generate a public key and a private key of the service supplier;

causing each of the service receiving units to generate a public key and a private key of the corresponding service receiver;

transmitting the generated public keys and private keys from the service supplying unit and each of the service receiving units to a certificate authority;

causing the certificate authority to generate certificates corresponding to the received public keys one by one and to transmit the generated certificates to the service supplier and each of the service receiving units, respectively; and causing the service supplying unit and each of the service receiving units to receive the certificates, respectively, wherein each of the service receiving units: prepares data obtained by linking appended information including the certificate of the corresponding service receiver with the received contract information in a predetermined order; generates a hashed element by compressing the linked data using a predetermined unidirectional function; generates an electronic signature by enciphering the hashed element using a private key of the service receiver; generates said one party-signed contract information by synthesizing the enciphered electronic signature with the linked data; and transmits the one party-signed contract information to the service supplying unit, and wherein the service supplying unit: receives the one party-signed contract information transmitted from each of the service receiving units; retrieves the appended information and signature added by each service receiver from each of the plurality of received copies of said one party-signed contract information; prepares data obtained by linking the retrieved information with appended information including the certificate of the service supplier in a predetermined order; generates a hashed element by compressing the linked data using a predetermined unidirectional function; generates an electronic signature by enciphering the hashed element using the private key of the service supplier; and prepares said service supplier-signed contract information by synthesizing the enciphered electronic signature with the linked data.

40. An electronic certification system according to claim 20, wherein the system further:

causing the service supplying unit to generate a public key and a private key of the service supplier;

causing each of the service receiving units to generate a public key and a private key of the corresponding service receiver;

transmitting the generated public keys and private keys from the service supplying unit and each of the service receiving units to the terminal of the certificate authority;

causing the terminal of the certificate authority to generate certificates corresponding to the received public keys one by one and to transmit the generated certificates to the service supplier and each of the service receiving units, respectively; and causing the service supplying unit and each of the service receiving units to receive the certificates, respectively;

wherein each of the service receiving units: prepares data obtained by linking appended information including the certificate of the corresponding service receiver with the received contract information in a predetermined order; generates a hashed element by compressing the linked data using a predetermined unidirectional function; generates an electronic signature by enciphering the hashed element using a private key of the service receiver; generates said one party-signed contract information by synthesizing the enciphered electronic signature with the linked data; and transmits the one party-sized contract information to the service supplying unit, and wherein the service supplying unit: receives the one party-signed contract information transmitted from each of the service receiving units; retrieves the appended information and signature added by each service receiver from each of the plurality of received copies of said one party-signed contract information; prepares data obtained by linking the retrieved information with appended information including the certificate of the service supplier in a predetermined order; generates a hashed element by compressing the linked data using a predetermined unidirectional function; generates an electronic signature by enciphering the hashed element using the private key of the service supplier; and prepares said service supplier-signed contract information by synthesizing the enciphered electronic signature with the linked data.

* * * * *